(12) United States Patent
Van Steen et al.

(10) Patent No.: US 10,081,529 B2
(45) Date of Patent: *Sep. 25, 2018

(54) TRANSPORTABLE BOTTLING PLANT FITTED INTO FREIGHT CONTAINER

(75) Inventors: Christophe Van Steen, Aartselaar (BE); Jozef Hermans, Vosselaar (BE)

(73) Assignee: CONTENO, Aartselaar (BE)

( * ) Notice: Subject to any disclaimer, the term of this patent is extended or adjusted under 35 U.S.C. 154(b) by 990 days.

This patent is subject to a terminal disclaimer.

(21) Appl. No.: 14/375,874

(22) PCT Filed: Feb. 1, 2012

(86) PCT No.: PCT/EP2012/051705
§ 371 (c)(1),
(2), (4) Date: Nov. 4, 2014

(87) PCT Pub. No.: WO2013/113384
PCT Pub. Date: Aug. 8, 2013

(65) Prior Publication Data
US 2015/0274498 A1 Oct. 1, 2015

(51) Int. Cl.
*B67B 3/00* (2006.01)
*B67C 3/00* (2006.01)
(Continued)

(52) U.S. Cl.
CPC .......... *B67C 3/008* (2013.01); *B29C 49/08* (2013.01); *B29C 49/58* (2013.01);
(Continued)

(58) Field of Classification Search
CPC ..... B67C 3/008; B67C 3/02; B67C 2003/227; B60P 3/14; B29C 49/00; B29C 49/08; B65B 3/022
(Continued)

(56) References Cited

U.S. PATENT DOCUMENTS 3,780,644 A * 12/1973 Canfield ................. B60P 3/00
99/455
6,032,574 A * 3/2000 Brayton ................. E04H 5/02
99/486

(Continued)

FOREIGN PATENT DOCUMENTS

DE 19615454 A1 * 10/1997 ............. B60P 3/14
DE 19824846 A1 * 12/1999 ............. B67C 7/002
(Continued)

*Primary Examiner* — Nathaniel Chukwurah
*Assistant Examiner* — Eduardo R Ferrero
(74) *Attorney, Agent, or Firm* — Reinhart Boerner Van Deuren P.C.

(57) ABSTRACT

Transportable bottling plant fitted into freight container Disclosed is a transportable bottling plant (100) comprising a freight container divided into separate rooms (107-110), one of the rooms being a bottling room (107); a preform feeder (118), a bottle forming unit (300), a bottle filling and closing unit (119) being mounted in the bottling room; whereby the container comprises at least three technical rooms, the power generator (111) being mounted in a first technical room (108), the air conditioning unit (115) being mounted in a second technical room (109) and the air compressor (113) being mounted in a third technical room (110).

15 Claims, 8 Drawing Sheets

(51) Int. Cl.
*B65B 3/02* (2006.01)
*B67C 3/02* (2006.01)
*B67C 7/00* (2006.01)
*B29C 49/08* (2006.01)
*B29C 49/58* (2006.01)
*B29C 49/64* (2006.01)
*B67C 3/22* (2006.01)
*B29C 49/00* (2006.01)
*B29C 49/06* (2006.01)

(52) U.S. Cl.
CPC .......... *B29C 49/6409* (2013.01); *B65B 3/022* (2013.01); *B67B 3/00* (2013.01); *B67C 3/02* (2013.01); *B67C 7/00* (2013.01); *B29C 49/00* (2013.01); *B29C 49/06* (2013.01); *B29C 49/6418* (2013.01); *B67C 2003/227* (2013.01)

(58) Field of Classification Search
USPC .......................................................... 53/452
See application file for complete search history.

(56) References Cited

U.S. PATENT DOCUMENTS

2011/0302881 A1* 12/2011 Van Steen ............... B67C 3/008
53/127
2013/0019570 A1* 1/2013 Weible ................ B29C 49/4205
53/452

FOREIGN PATENT DOCUMENTS

| EP | 0359300 A1 * | 3/1990 | ............. A23C 9/122 |
| FR | 2268667 A1 * | 11/1975 | ................ B60P 3/14 |
| WO | WO 2011/095464 A1 | 8/2011 | |
| WO | WO 2014060981 A1 * | 4/2014 | ............... B65C 3/06 |

* cited by examiner

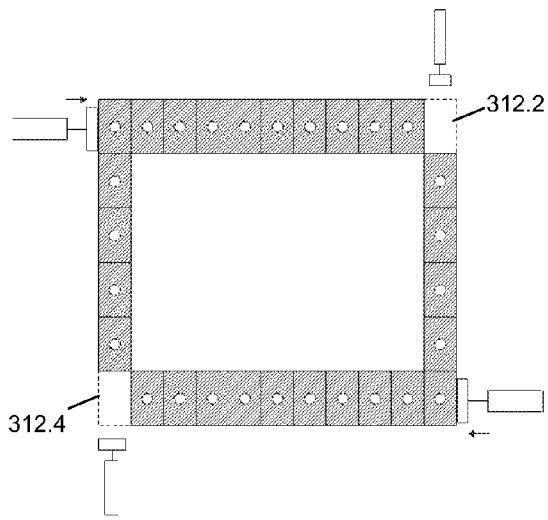
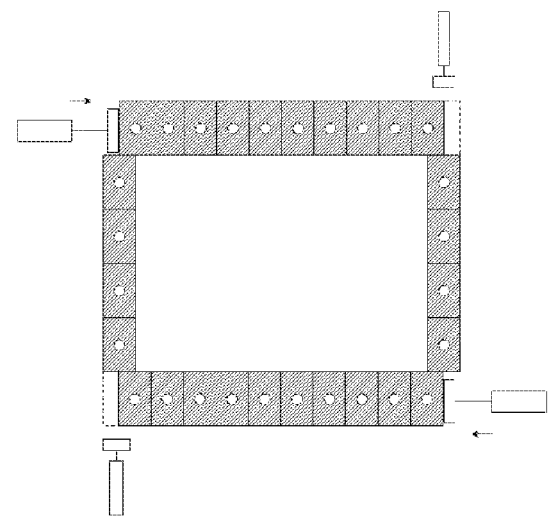
FIG. 8A　　　　　　　FIG. 8B
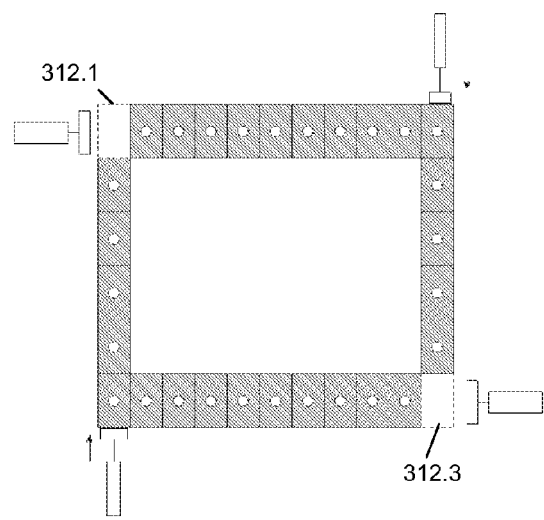
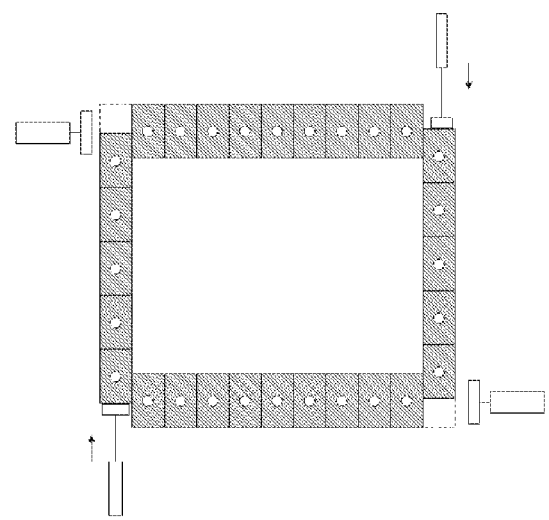
FIG. 8C　　　　　　　FIG. 8D

TRANSPORTABLE BOTTLING PLANT FITTED INTO FREIGHT CONTAINER

FIELD OF THE INVENTION

The present invention relates to a transportable bottling plant which fits or is fitted into a freight container. More particularly, the invention relates to an improved layout of the bottling plant equipment and ancillaries into the confined space of a freight shipping container, for example a 20-foot freight shipping container.

BACKGROUND OF THE INVENTION

Bottling plants, in particular transportable bottling plants adapted for producing drinkwater bottles, are known from WO 2011/095464 A1 and US 2011/0302881.

WO 2011/095464 A1 discloses an automated single machine capable to blow the bottle out of a preform and to fill and cap the bottle, which is presented as fitting into a transportable Norm ISO 668 "ISO-Container". The bottling plant shown in FIG. 1 comprises one closed loop transport unit running from station to station, which stations in sequence insert a PET preform, heat the preform, verify the temperature of the heated preform, blow the PET bottle, irradiate the bottle with UV light, fill the bottle, close off the bottle, eject the filled and sealed bottle, upon which the carriers are returned back to the preform insertion station. Alternatively as shown in its FIG. 10, the plant comprises an additional return loop by which improperly heated preforms are not discarded but are returned back to the entry into the heating station. The freight container comprising the plant is accessible through a single double door on one of the smaller sides of the container, and further contains an air conditioning unit in order to assure an optimal processing stability. The closed loop unit, even in its most simple form of FIG. 1, occupies a substantial amount of the space inside the freight container, and leaves little room for extra equipment.

WO 2011/095464 A1 has declined to show from where the bottle forming unit obtains its compressed air, typically requiring relatively high pressures, and which air should comply with the high demanding requirements of legal standards, such as ISO standard 8573 for compressed air in the production of food and stimulants. It is not clear how these extra but necessary facilities may be fit into the same freight container, together with the bottling unit and its closed loop transporting unit. It remains thereby important to maintain the high hygienic standards with which the space containing the bottling plant, also called the bottling room, and thus all equipment contained therein, is expected to comply. The transportable bottling plant of WO 2011/095464 A1 therefore has the disadvantage that it is expected to require possibly several separate ancillary units for allowing its operation in the field, such as an air compressor and a water treatment unit and possibly also a power generator for applications where no mains network is available.

US 2011/0302881 discloses a standard ISO 20 foot freight container, separated into a bottling room and a technical room at the back side by a separation wall comprising both thermal and acoustic isolation. The bottling room contains all the elements of a bottling plant, namely preform feeder, bottle forming unit, filling and closing unit, one transferring device for feeding the preforms to the bottle forming unit and a second transferring device for feeding the blown bottles to the filling and closing unit. The bottling plant operates fully automatically without any operator intervention required during normal operation. The technical room contains the power generator providing electric power to the units in the bottling room, an air compressor for providing pressurized air to the bottle forming unit, and an air conditioning unit for conditioning the air present in the bottling room. This transportable bottling plant is thus fully automated, fits into a standard 20-foot ISO container, and its bottling room conditions comply with international regulations on hygiene, safety, heat and noise, which are easier to maintain because of its isolation and insulation from the technical equipment in the technical room. Yet it is substantially fully equipped while its ancillary units do not have to comply with the high hygienic standards of the bottling room.

The bottling plant of US 2011/0302881 functions well, but a number of improvements seem desirable to increase hygienic conditions.

Definitions

As used herein, with a "standard 20-foot freight container" is meant a container compliant with the dimensional requirements for an ISO 668 standard 20-foot freight container. The height of such a freight container is typically 8 or 8.6 feet.

As used herein, with "drinking water or potable water" is meant water that is pure enough to be consumed or used with low risk of immediate or long term harm.

As used herein, with "freshwater" is meant naturally occurring water on the Earth's surface in ice sheets, ice caps, glaciers, bogs, ponds, lakes, rivers and streams, and underground as groundwater in aquifers and underground streams. Fresh water is generally characterized by having low concentrations of dissolved salts and other total dissolved solids.

As used herein, with "bottle" is meant to include all kinds of hollow article suitable for use as a recipient, irrespective of its size and dimensions, in particular the relative proportions of a body part, provided for receiving a content, which may be any liquid or fluent product, and a neck part, delimiting an access opening for the filling, i.e. the placing of the content inside the body part, and typically also for the emptying, i.e. for extracting the content from the body part. The term "bottle" in a more narrow meaning is meant to include the recipients more commonly addressed as bottles, i.e. whereby the neck part is distinctly narrower than the body part, but also pots of which the neck part is hardly narrower than the body part.

As used herein, with "bottling plant" is meant to include any plant in which a bottle (as defined above) is produced from a preform and subsequently filled with a liquid or fluent product, including but not limited to water, sodas, wine, vegetable oils such as cooking oil, mineral oils such as motor oil, detergents, cleaning products, soft drinks, foods such as sauces, powders, such as milk powder, coffee powder, herbs or spices, chemical and pharmaceutical products, etc.

SUMMARY OF THE INVENTION

It is an aim of the invention to provide a transportable bottling plant with which hygiene can be improved.

The above aim is achieved with the invention comprising the technical characteristics of the first claim.

According to a first aspect of the invention, a transportable bottling plant is provided which comprises a freight container, for example a standard 20-foot freight container but also a 30-foot, 40-foot or other freight container is possible, having an internal volume divided into separate rooms, one of which being a bottling room. A preform feeder, a bottle forming unit and a bottle filling and closing unit mounted in the bottling room. The preform feeder is provided for feeding preforms to the bottle forming unit. The bottle forming unit comprises a heater or furnace for heating the preforms and a moulder for moulding the preforms into bottles by making use of pressurized air. The filling and closing unit comprises a filling unit for filling the bottles with a liquid or fluent product and a closing unit for closing the bottles with caps. Optionally, a bottle marking or labelling device may also be mounted in the bottling room for marking or putting labels on the filled bottles.

An air compressor, an air conditioning unit and possibly also a power generator are mounted inside the internal volume of the container but outside the bottling room. The air compressor is provided for supplying pressurized air to at least the bottle forming unit. The air conditioning unit is provided for conditioning the air present in the bottling room. The power generator, if present, is provided for generating electric power for the units of the transportable bottling plant, but is not essential—the units may also be powered by connection to e.g. an electricity network if this is available, in which case the power generator may be omitted.

According to the invention, the internal volume (separate from the bottling room) comprises at least a first technical room adapted for mounting the power generator, if present (i.e. the first technical room provides sufficient space for a power generator capable of supplying sufficient power), a second technical room in which the air conditioning unit is mounted and a third technical room in which the air compressor is mounted. The first, second and third technical rooms are separated and sealed from each other, so that transfer of e.g. air, exhaust gases, heat, vibrations and/or noise from one technical room to the other can be prevented or suppressed.

The inventors have found that the present invention can bring the advantages of improved hygiene and safety, in particular a possible improvement in the compliance of the plant with the international regulations on hygiene, safety, heat and noise. Because in the present invention, separate technical rooms (i.e. compartments which are separated and sealed from each other) are provided for the different types of ancillary equipment, by appropriately separating/splitting the equipment items, the separate technical rooms do not necessarily have to comply with the same regulations and standards. For example, different standards (safety, hygiene, noise, accessibility, etc. . . . ) may be applied for the technical room for the power generator as compared to the technical room containing the air conditioning unit, compressor, dryer, or any product treatment, buffering and/or processing facilities. These different technical rooms may thus be compliant with different requirements for hygiene, safety, noise, accessibility, etc. This offers extra degrees of freedom for the selection of the individual equipment items, and allows arrangements which would not be allowable if all the ancillary equipment would have to be located in the same technical room. For instance, an intake of extra/fresh air to the air conditioning unit may now be taken directly from the second technical room itself, of which the quality is better controllable than this of the first technical room. By the separation, contamination risks are minimized since the air conditioning unit or compressor do not take air in from the first technical room in which a fossil fuel driven power generator and associated fuel tank may be located. Also, any product treatment, buffering and/or processing facilities may now be located in a room separate from such power generator.

In particular, with the improved lay-out according to the invention, the following subdivision into hygiene/safety levels is achievable, wherein level 1 has the lowest and level 5 the highest hygiene requirements and each level may mean a separate room/compartment in the container:

Level 1: power generator;
Level 2: compressor, air dryer;
Level 3: product treatment, buffering and/or processing facilities (e.g.
  freshwater polishing or purification, . . . ), centralised product (e.g. freshwater) feeding and discharging system,
Level 4: air conditioner, chiller;
Level 5: bottling room.

Note that subdivision into levels does not necessarily imply that each level requires a separate compartment in the transportable bottling plant according to the invention. For example, the units of level 3 and 4 may be mounted in the second technical room.

Another advantage is that the improved layout may provide more space for the ancillary equipment. This is advantageous since there may be a need for providing higher pressure air to the bottle forming unit e.g. in view of a higher production rate, a need for more air conditioning capacity e.g. in view of being able to work in more demanding ambient conditions worldwide, a need for more space e.g. in view of integrating a water polishing or purification system to use the system for more types of polluted water, and hence also for more generated power to the overall bottling plant. These needs may call for more powerful and thus larger equipment for the increased power, air-conditioning and air compression equipment in comparison with the transportable bottling plants known in the art. The improved lay-out according to the invention can provide the space outside the bottling room for such larger equipment within the same total space, which may be as small as the internal volume of a freight container, even as small as a standard 20-foot freight container.

Another advantage is that by appropriately locating the technical rooms within the freight container, good access can be maintained to all individual technical equipment items. In addition, the locations of the individual technical equipment items may be chosen with more freedom, and the layout may be chosen such that desired proximity of a particular set of units may be obtained, and conversely that desired distances between a particular set of units may also be obtained.

As a result of these advantages, a containerized plant is obtained which may easily comply with international and/or local regulations and legislation for safety and hygiene and nonetheless guarantee a stable and reliable bottling and/or packaging process and which may be equipped with tailor made features. Such a containerized plant is an outstanding logistical solution: the costs are inferior when a product is bottled and/or packed locally compared to long distance transport. Import taxes can be diminished in many occasions. The risk on quality problems is low since damage of products is inferior when products are bottled and/or packed locally compared to long distance transport. The risk on investment is low: the risks involved with stationary plants may be avoided because the bottling plant is transportable to other regions in case of local problems. Such a containerized plant is a fast solution: the containerized bottling plant has a extremely short installation and start-up period, it can be prepared and ready for immediate shipment and it is a plug-and-play system.

As a result, the containerized plant of the invention can be quickly set up for various solutions: providing bottled drinking water at places struck by calamity or for military operations, setting up a bottling/packaging plant for any product in a very short term, etc.

Regarding military operations, troops are often operating in remote areas where supply chain is complex. Transporting water and fuel are very costly also because it is guarded. The risk of contamination of water (poison) is never excluded. With the containerized plant of the invention, these problems can be avoided.

Regarding disaster relief, when roads are blocked, it is very difficult to transport bottled water. In the field of human aid, a problem is that the cost of logistics and keeping stock of bottled water can be very high. With the containerized plant of the invention, such problems can be avoided.

Companies are looking to sell their products all over the world, also in remote and/or less developed regions and/or emerging markets. Importing bottled and/or packed products towards remote and/or less developed regions can be expensive and often a logistical nightmare. Moreover, when transporting products over long distance, the risk for damage and/or loss can be high. In many countries, when products are produced locally, taxes can be less compared to imported products. Local bottling and/or packaging of products and/or liquids such as foods, beverages, household and cleaning products, chemicals, pharmaceutical products, etc. . . . , can have many advantages. But setting-up a permanent or stationary bottling and/or packaging facility or factory can be risky, expensive, very time consuming and complex. Time consuming because the right location of the terrain has to be found, selected and acquired, building permits and environmental permits may have to be obtained, utility supply systems may have to be provided, the building has to be constructed or existing buildings have may to be modified for the purpose, the machinery has to be implemented and started-up. Risky because when setting up a permanent or stationary bottling plant inclusive terrains, buildings, machinery, etc. . . . , in remote and/or less developed and/or instable regions, companies desire a guaranteed future, but often there is no guarantee to keep the local bottling and/or packaging plant over a longer period of time. Often, there may be lack of sufficient political, economic or market stability. Other influences, such as tribal issues, corruption or mafia issues, changing local powers, do not promote setting up permanent bottling factories. There may also be small production needs, because local consumption can be moderate or for testing the market first. Complex because in many remote and/or less developed and/or instable regions, there may be a lack of trained operators and engineers to guarantee a normal production process of an industrial and/or complex bottling installation. All these issues and uncertainties can prevent companies to start-up a permanent facility and/or factory. The containerized plant of the invention may however present a solution by which such issues and uncertainties can be avoided.

In embodiments according to the invention, the first technical room, the second technical room and the bottling room may be separated from each other by separation walls which span the entire width and height of the freight container. This means that these rooms are located one after the other in longitudinal direction of the freight container. Such an arrangement has the advantage that the available space may be used more efficiently. Two or more of the technical rooms, e.g. the first and third technical rooms, may be located above each other and may together take up substantially the entire width and height of the freight container. One of the technical rooms, e.g. the second technical room, may alone take up substantially the entire width and height of the freight container.

In embodiments according to the invention, the freight container may be provided with personnel access to the bottling room separate from personnel access to the first technical room and preferably also separate from personnel access to the second and/or to the third technical room.

In embodiments according to the invention, the first technical room may be located at one short side of the freight container and the second technical room may be located at the opposite short side of the freight container. An additional advantage can thus be obtained, in that the power generator exhaust and fresh air intake of the air-conditioner may be located as far as possible from each other (the opposite side of the freight container), minimizing the risk of ingress of fumes or exhaust gases by the air-conditioner system into the bottling room.

In embodiments according to the invention, personnel access to the bottling room and windows for supplying the preforms, the bottle caps and discharging filled bottles may be provided on the same side of the freight container, preferably a long side of the freight container. It is customary that a tent is placed at the personnel access to the bottling room, to reduce the risk of dirt entering the bottling room when the plant is used in open air. An additional advantage can thus be obtained by locating all accesses for personnel to the bottling room on one side of the freight container, i.e. inside the same tent.

In embodiments according to the invention, the first technical room and the bottle forming unit may be mounted in the freight container with at least one other unit of the bottling plant mounted between them, preferably the bottle forming unit being located in a corner of the bottling room which is opposite the part of the bottling room adjacent to the first technical room, where the power generator may be mounted. This can offer the further advantage that the heaviest pieces of equipment, by far being the power generator and the bottle forming unit, are located far preferably as far as possible from each other, which facilitates handling during transport and increases safety.

In a second aspect, which may be combined with the other aspects described herein, the invention provides a bottling plant comprising a bottling room enclosing a bottle forming unit for forming bottles from thermoplastic bottle preforms, the bottle forming unit comprising a furnace for heating the thermoplastic bottle preforms in a heating compartment, a moulder for moulding the heated preforms into bottles and transporting means for transporting the bottle preforms through the heating compartment and into the moulder, the furnace comprising a hot air exhaust conduit leading from the furnace towards the outside of the bottling room and provided with an induced draft fan for withdrawing hot air from the heating compartment. The furnace comprises a fresh air inlet conduit leading from the outside of the bottling room to the heating compartment for leading fresh air from the outside of the bottling room to the heating compartment.

In such a configuration, fresh air can be supplied to the furnace from outside the bottling room and air intake from inside the bottling room can be reduced or avoided altogether. This relaxes the requirements for systems used for conditioning the air in the bottling room, such as for example an air conditioning system and/or a system for providing overpressure in the bottling room for hygiene reasons, in general systems which are provided to supply air to the bottling room to keep the air in the bottling room within certain desired parameters such as temperature, humidity, pressure and the like. For example, since fresh air is being led to the heating compartment from outside the bottling room, an overpressure which may be created in the bottling room is less or not affected and the overpressure system does not or to a lesser extent need to be burdened with replacing any air drawn in to the heating compartment. As a result, the overpressure system can save on power consumption and possibly can be less performant, i.e. smaller in size and lower in weight, which can be advantageous in the context of transportable bottling plants. An additional advantage is that an air conditioned bottling room is not or less influenced by the furnace airflow and can thus be more energy efficient.

According to the invention, the furnace may comprise a hot air exhaust conduit leading from the furnace towards the outside of the bottling room, equipped with an induced air fan for withdrawing hot air from the furnace to outside the bottling room. Such a configuration allows to substantially completely separate the hot air flow relating to the furnace from the air in the bottling room, such that influence on the conditions of the air in the bottling room can be reduced or avoided altogether.

By evacuating the hot air inside the furnace and replacing it with cooler air from outside the bottling room, it is possible to heat up the preforms mainly by radiation and less by convection. Thus, a more stable preform heating process can be ensured.

It has been found that close control of the temperatures inside the furnace depends on a sufficient and steady air flow through the furnace, as the air flow is also the preferred way for furnace energy to leave the air conditioned bottling room. The volume of air needed for extracting the amount of energy has been found to be significant. The inventors have found that the present invention brings the advantage that the volume of hot air discharge from the preform heating furnace does not, or to a lesser extent, need to be replaced with air from inside the bottling room. It has been found that the quality requirements of the air drawn into the furnace are less critical than those governing the bottling room atmosphere. It may be important that the air drawn into the furnace is for example dust-free, but its humidity and/or its temperature are typically unimportant or at least of a minor relevance as long as not excessively low or high.

According to embodiments of the current invention, the inlet conduit can be provided with a forced draft fan for providing fresh air to the heating compartment, as such fan allows to control the flow of air through the furnace. This embodiment can further bring the advantage of a possibility to size the two fans larger, such that the air flow through the furnace can be higher and the temperature inside the furnace can be better controlled.

According to embodiments of the current invention, the furnace can comprise control means configured to control the induced draft fan and the forced draft fan such that the amount of hot air withdrawn from the heating compartment is smaller than or equal to the amount of fresh air provided to the heating compartment. Such a configuration allows to further improve control of the air inside the bottling room as it can be prevented that air from inside the bottling room is drawn into the furnace and through the exhaust such that, for example, the overpressure inside the bottling room could become decreased.

According to embodiments of the current invention, the bottling plant can further comprise a filter for filtering the fresh air taken in through the fresh air inlet conduit. Such a configuration allows to avoid that undesired particles such as for example dust enters the bottling room, more in particular the furnace.

According to embodiments of the current invention, the bottle plant can further comprise a room overpressure system for maintaining a pressure in the bottling room which is above the pressure of the atmosphere surrounding the bottling room. Such a configuration has the advantage that it may avoid that air is drawn into the bottling room when a door or other opening towards the surrounding atmosphere is opened, and thereby may prevent any contamination of the air in the bottling room.

According to embodiments of the current invention, the fresh air inlet conduit can be provided with a pressure relief valve for relieving any excessive fresh air. Such a pressure relief valve further allows to control the pressure inside the furnace, more in particular the heating compartment, and may further assist in obtaining, or obtain, an overpressure in the bottling room.

According to embodiments of the current invention, the pressure relief valve can be provided with a counterweight for controlling its opening. Although simple in construction, such a relief valve has been found very reliable and inexpensive. Moreover, such a relief valve does not require power to function and is easy in maintenance.

According to embodiments of the current invention, the heating compartment of the furnace can be provided with radiation heating equipment, preferably heating lamps. Such radiation equipment has been found to allow an improved heating of the bottle performs, as radiation heating can be directed with improved accuracy at a specific part of the perform allowing an improved moulding of the bottles starting from the performs.

According to embodiments of the current invention, the heating compartment can be partitioned in a plurality of heating zones, the heating zones preferably arranged in parallel in the direction of movement of the bottle preforms, the heating zones more preferably being provided for each heating a different portion of the body of the bottle perform. It has been found that such a configuration allows an improved preheating of the bottle preforms and thus allows an improved moulding of the bottles in the moulder. The moulder can for example be a blow-moulder or a combination stretch/blow-moulder, or any moulder known to the person skilled in the art of moulding bottles from preforms.

According to embodiments of the current invention, the bottling plant can be provided with means for measuring the temperature of at least one and preferably all of the different portions of the body of the bottle preform exiting the heating compartment. Such a means for measuring the temperature of at least one and preferably all of the different portions of the body of the bottle preform exiting the heating compartment allows to, for example, check whether the bottle performs is correctly preheated before entering the moulder such that improperly moulded bottles can be avoided.

According to embodiments of the current invention, the furnace can be provided with means for controlling the heat provided to the bottle preform by the furnace depending on the measured temperature by the means for measuring the temperature of at least one and preferably all of the different portions of the body of the bottle preform exiting the heating compartment. Such a configuration allows to control the heating of the performs in function of the measured temperatures of, for example, previous bottles such that the temperature provided by the furnace to the preforms can be adapted to the specific conditions inside the bottling room, which can depend on for example, the circumstances wherein the bottling room is used, for example, cold regions, warm regions, humid regions, dry regions, etc., but also on shorter term variations, especially since the air provided to the heating compartment of the furnace by the fresh air inlet conduit can be substantially or totally provided from outside the bottling room.

According to embodiments of the current invention, the transporting means can be provided to transport a file of bottle preforms through the heating compartment and thereto comprise an array of carriers with a respective carrier for receiving the respective bottle preforms.

According to embodiments of the current invention, heat shields can be provided for shielding the preform neck from the heat provided in the heating compartment of the furnace. Such a heat shield can prevent the neck of the preform from undesired heating and, ultimately, from deforming during moulding as the neck usually is already in its desired form before moulding of the bottles.

According to embodiments of the current invention, the transporter can comprise means for rotating the bottle preform around its longitudinal axis while it is being moved through the heating compartment, preferably for continuously rotating the preform during its entire path through the heating compartment. Such rotating means allows a more rotation-symmetric heating of the preform avoiding malformation of the bottles during moulding.

In an embodiment, the bottle forming unit may comprise a bottle marking device located adjacent to the transporter at a carrier position downstream of the moulder. Such an arrangement has the advantage that the bottles can be marked while still on the transporter of the bottle forming unit, which is convenient since a stable position of the bottles is desired for the marking step. As will be explained herein, the marking step can be added into the bottle forming unit without increasing the size of this unit, so space can be saved.

An additional exhaust conduit may be provided leading from the carrier position at the bottle marking device, i.e. where the marking step occurs, to the hot air exhaust conduit, the additional exhaust conduit being provided for withdrawing fumes created upon marking the bottles by means of the bottle marking device, which may for example be a laser device. Such an arrangement has the advantage that the fumes created upon marking the bottles can be withdrawn from the bottle forming unit via the hot air exhaust conduit which has the induced draft fan, i.e. without additional effort.

According to a third aspect, which may be combined with the other aspects described herein, the invention provides a bottle forming unit for forming bottles from bottle preforms, the bottle forming unit comprising a furnace for heating the bottle preforms and a moulder for moulding the heated preforms into bottles, the bottle forming unit further comprising a transporter for moving the bottles and/or the preforms, wherein the transporter comprises a plurality of movable carriers arranged for carrying the preforms and/or bottles, and comprises guiding elements for guiding the movable carriers, the guiding elements defining a loop of carrier positions where a carrier can be positioned, along which loop the carriers can be transported, the loop being provided for moving the carriers through the furnace and for moving the carriers from the furnace into the moulder, said loop having at least four corners, preferably at most four corners, at which a carrier position is provided, wherein the transporter comprises at least four advancers, an advancer being arranged for moving a carrier positioned at a corner away from that corner, wherein an amount of carriers and an amount of carrier positions are adjusted so that at least two, and with four corners preferably at most two, carrier positions along the loop are free of a carrier, said at least two carrier positions in use being positioned at diagonally opposed corners of the loop. The transporter may be provided with a controller for controlling the advancers. The controller may be arranged for simultaneously moving, by means of the advancers, carriers positioned at at least two diagonally opposed corners of the loop from those corners. Thus, the controller may be arranged for moving a carrier away from one of the corners by means of an advancer simultaneously with moving another carrier away from another one of the corners by means of an advancer, said another one of the corners being arranged in the loop diagonally opposed to said one of the corners.

As the loop has at least four corners, a freedom for choosing a shape of the loop may be improved compared to a known semicircular loop. Thus, the loop may be arranged in a freight container more efficiently than the known semicircular loop. By moving, by means of the advancers, simultaneously carriers positioned at at least two diagonally opposed corners of the loop from those corners, a speed of moving carriers along the loop may be increased, compared to subsequent advancement of carriers.

The term "simultaneously moving" may be interpreted broadly. Hence, optionally, simultaneously moving a first carrier and a second carrier may mean that at least part of the movement of the first carrier takes place at the same time as at least part of the movement of the second carrier, i.e. the movements at least partly overlap each other. However, optionally, the term "simultaneously moving" may be interpreted more strictly. Then, at least 50%, preferably at least 80%, of a movement time of the first carrier takes place at the same time as movement of the second carrier.

For a loop having at least four corners, the inventors realised that a production rate of bottles can be increased by using two or more empty positions in the carrier system instead of one empty carrier position. This makes it possible to advance, e.g. push, two rows of carriers simultaneously instead of advancing, e.g. pushing, one row of carriers consecutively. Thus, the controller may be arranged for making two or more simultaneous translational movements of a row of carriers, instead of sequential translational movements of one single row of carriers after movement of another single row of carriers. Thus, time needed for activating an advancer may be saved and an increased production rate may be achieved.

Thus, the controller may be arranged to operate the advancers so that two advancers located at diagonally opposed corner positions of the loop operate substantially simultaneously. By such operating, the two advancers by their operation may vacate carrier positions at at least two diagonally opposed corners.

In an embodiment, the loop has the form of a rectangle. The semi-circular loop of US 2011/0302881 implies that the carriers may have to turn somewhat with every step in every pass along the curved part of the semi-circular loop. This may impose a limitation on a speed which the carriers may be given relative to their guiding elements, as well as on a minimum radius of the curved part of the semi-circular loop. This may represents a production rate limitation. Such limitation may become in particular relevant for relatively large bottles. Hence, the limitation may be more important for relatively large bottles having a volume of e.g. 5 liter, as compared to smaller bottles having a volume of e.g. 1, 1.5 or 2 liter, as a carrier need to be larger for a larger bottle.

In an embodiment, at least one part of the loop, preferably each part of the loop, is substantially parallel to another part of the loop. Such may e.g. be achieved in a loop that has the form of a rectangle. Preferably, the loop is closed in itself. Preferably, the loop is substantially horizontal. Preferably, the carriers are similarly shaped. Preferably, for all carriers, one and the same side of the carriers is movably connected to guiding elements.

Preferably, the transporter comprises an advancer at each of the at least four corners of the loop. Preferably, each advancer is provided for advancing the carrier positioned at the corner over at least a single carrier position, e.g. a single carrier position or two carrier positions. Preferably, at each corner an advancer is provided for moving a carrier positioned at said corner away from that corner.

In an embodiment, the amount of carriers and the amount of carrier positions are adjusted so that, in use, by advancing the carrier positioned at a corner away from that corner, a file of carriers abutting the carrier positioned at said corner is moved away from that corner and towards a next corner. Preferably, the amount of carriers and the amount of carrier positions are adjusted so that, in use, by advancing the carrier positioned at a corner of the at least four corners away from that corner, a file of carriers substantially abutting the carrier positioned at said corner is moved away from said corner towards a next corner located downstream of said corner. As a result of the advancing, a leading carrier of said file of carriers may optionally be positioned at said next corner. Preferably, the controller is arranged to advance the carrier positioned at the next corner after advancing the carrier positioned at the corner located upstream of said next corner.

In an embodiment, the controller is arranged to operate the advancers so that the two advancers of each set of advancers positioned at diagonally opposed corner positions of the loop are operated substantially simultaneously. As a result, a production rate of bottles may e.g. be further increased. Preferably, the two advancers of each set by their operation vacate carrier positions at at least two diagonally opposed corners, e.g. corners where the two advancers are positioned.

In an embodiment, the carriers, and preferably the carrier positions, have a first dimension and further have, measured in a direction transverse to the first dimension, a second dimension that is smaller than the first dimension. The transporter is preferably arranged for transporting the carriers in a transportation direction through the furnace with the second dimension aligned with the transportation direction through the furnace. The transporter is preferably arranged for transporting the carriers in a transportation direction through the moulder with the first dimension aligned with the transportation direction through the moulder. As a result, the amount of carriers in the furnace per unit of length along the loop in the furnace may be larger than the amount of carriers in the moulder per unit of length along the loop on the side of the moulder. Hence, optionally, the amount of preforms positioned in the furnace may be increased. Hence, optionally, a more gradual heating of preforms in the furnace may be achieved. Alternatively, the carriers may have similar dimension in a transportation directions of the carrier and transverse to a transportation direction of the carrier.

Preferably, only one of the corners is provided along a part of the loop in between the furnace and the moulder. As a result, heated preforms may enter the moulder relatively quickly after leaving the oven. Hence, optionally, cooling of the heated preforms on their path from the furnace to the moulder may be reduced.

Preferably, the moulder is a blow-moulder, more preferably a blow-stretch moulder. A blow-stretch moulder may combine well with a bottle forming unit. The stretching may diminish the size and/or weight of a driving unit which may be needed for the blowing. A reduced weight and/or size of the transportable bottle blowing unit may be appreciated when transporting the transportable bottle blowing unit.

In an embodiment, the moulder comprises a driving unit for driving the moulder, wherein the driving unit is positioned inside the loop of the transporter. Such positioning may yield a rather economical use of space, in particular when the bottle forming unit is placed in the container. Preferably, the mould is provided with a plurality of mould parts. Preferably, the driving unit is arranged for opening and closing the mould by moving the mould parts with respect to each other.

In a fourth aspect, which may be combined with the other aspects described herein, the bottling plant may comprise a bottle filling unit arranged for filling bottles with a liquid or fluent product, a product inlet for connecting a product supply for supplying the liquid or fluent product to the bottling plant, a product circuit comprising at least one conduit fluidly connecting the product inlet to at least one product outlet nozzle in the filling unit at which the product is filled into the bottles, and an arrangement for removing residual product from the product circuit after a period of operation of the bottling plant with at least one valve with a connector for connecting a pressurized air conduit, via which the product circuit is connectable to a pressurized air supply for forcing the residual product from the product circuit by means of pressurized air.

The inventors have found that the growth of germs and bacteria inside the bottling plant equipment may be reduced, prevented or avoided by forcing the residual product from the product circuit by means of pressurized air. This brings the advantage that before the bottling plant is taken out or service, any residual product and e.g. moisture remaining in the product circuit can be removed. With its product circuit in a dry, cleaned condition, the risk for germs and bacteria developing inside of it during a subsequent idle period can be significantly reduced. Under such conditions, the equipment which in a next operation comes again in contact with a product to be filled remains in a better condition, is easier to clean and the result can be a faster start-up of the plant.

The use of pressurized air over steam for removing residual product has the further advantage that wear to the components of the product circuit may be minimized. When using steam, it has been found that steam may condense and water particles may merge and form stagnant water zones inside the filling compartment of the filling unit and further remote at other locations inside the bottling room. This is not favourable for the equipment and especially not for electronic and electric equipment. And when water particles inside the bottling room are cooled down, germs and bacteria cultures may develop and flourish inside this room. Furthermore, the use of pressurized air over steam has the advantage that the need for steam producing equipment on location may be avoided.

According to embodiments of the current invention, the pressurized air supply may comprise an air compressor, e.g. the air compressor which is readily present for providing the pressurized air for the bottle blowing process. The air compressor may be arranged for supplying pressurized air at a pressure within the range of 15-25 bar, which may be reduced to a pressure within the range of 2-10 bar, preferably 4-6 bar upon injection into the product circuit. The air compressor may be provided with the air dryer for drying the pressurized air to a dew point for example below 5° C., preferably below 4° C. This may help, during the removal of residual product from the product circuit after operation, to ensure a sufficient removal of residual product from the product circuit to avoid bacteria growth.

According to embodiments of the current invention, the product circuit may comprise in succession from the product inlet to the at least one product outlet nozzle at least one of the following components: an infeed pump for pumping in the product, at least one filter stage for filtering the product, a buffer tank for buffering the product, a UV treatment unit for subjecting the product to UV treatment, a dosing pump for dosing the product towards the product outlet nozzle.

According to embodiments of the current invention, the bottling plant may be transportable and fitted into a freight container. The freight container may be divided into separate rooms, one of which being a bottling room in which the bottle filling unit is mounted and another one of which being a technical room in which the pressurized air supply equipment is mounted. The product inlet may be part of a centralised product infeed and discharge system provided in an outside wall part of the freight container.

According to embodiments of the current invention, the bottling plant may be provided with an inlet and an outlet for circulating a cleaning product through the product circuit, which may for example be the product inlet and outlet of the centralised product infeed and discharge system. A heating device may be provided at the product inlet for heating the cleaning product, so that its efficiency (e.g. the speed and/or the effectiveness of the cleaning operation) may be improved. Subsequent to the cleaning step, rinsing product (e.g. water or an alternative rinsing product) may be circulated through the product circuit for the purposes of rinsing the product circuit. The heating device, which may be provided at the product inlet, may also be used during this rinsing step to heat the rinsing product, so that subsequent drying of the product circuit by means of pressurized air may be facilitated (as the product circuit is brought to a higher temperature before drying). This subsequent drying may again be performed by the arrangement for removing residual product from the product circuit.

BRIEF DESCRIPTION OF THE DRAWINGS

The invention will be further elucidated by means of the following description and the appended drawings.

FIG. 8 schematically explains operation of a transporter of the bottle forming unit of FIG. 7.

DETAILED DESCRIPTION

Figure 1:
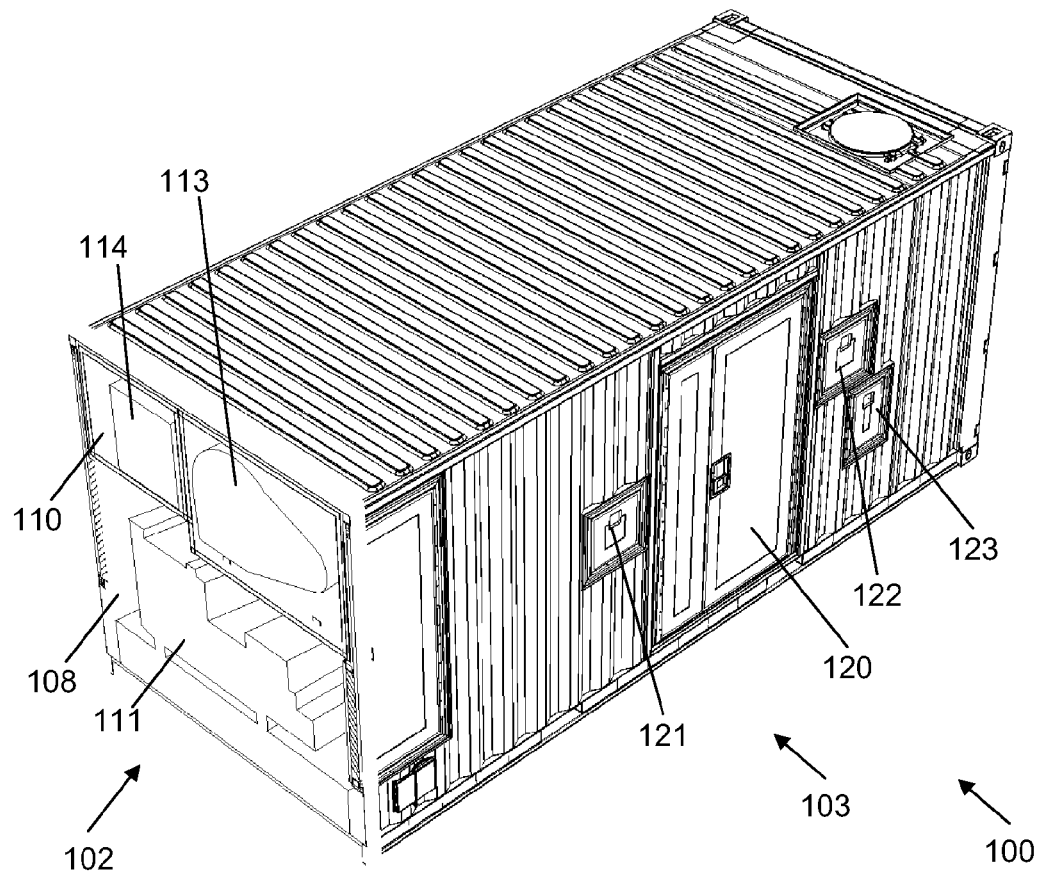
FIG. 1 shows a perspective view of a bottling plant according to a preferred embodiment of the invention, integrated into a 20-foot freight container, with the container doors at the back side taken away.
Figure 2:
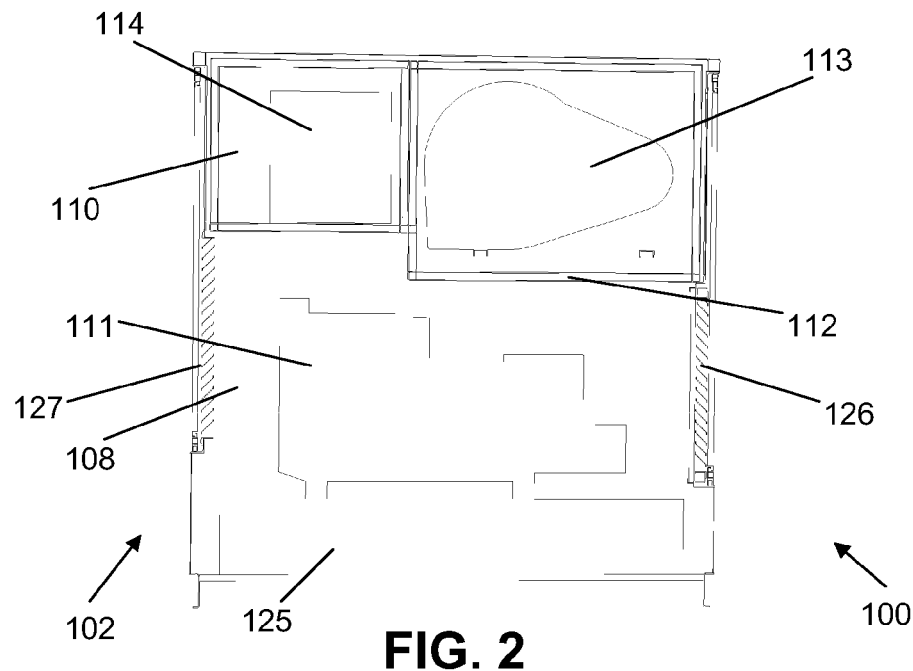
FIG. 2 shows a view onto the back side of the bottling plant of FIG. 1.
Figure 3:
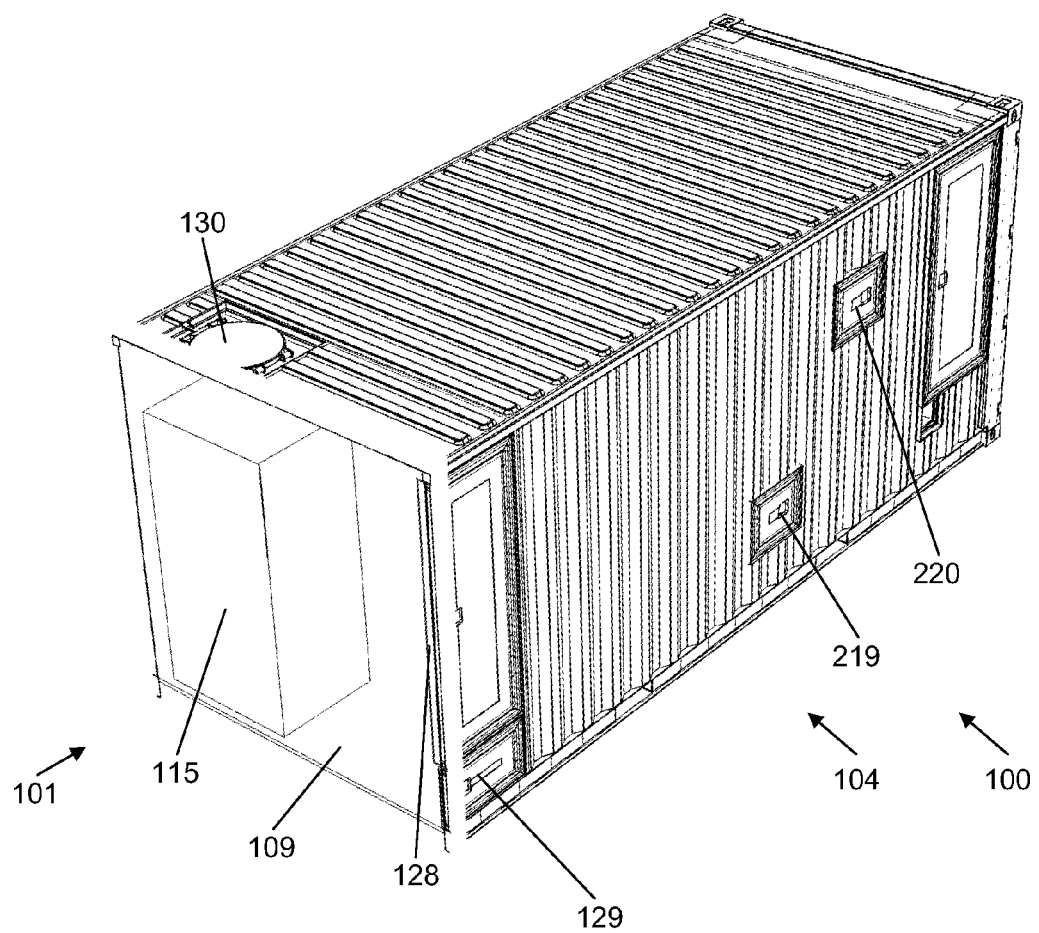
FIG. 3 shows another perspective view of the bottling plant of FIG. 1, with the container doors at the front side taken away.

The present invention will be described in the following with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In what follows, preferred embodiments of bottling plants according to the invention are described which may be tailored for supplying bottles filled with drinking water. However, with minor modifications, the bottling plants may be used for filling bottles with other liquid or fluent products, including but not limited to water, sodas, wine, vegetable oils such as cooking oil, mineral oils such as motor oil, detergents, cleaning products, soft drinks, foods such as sauces, powders, such as milk powder, coffee powder, herbs or spices, chemical and pharmaceutical products, etc. The principles described below are also applicable to such bottling plants.

The preferred embodiments are mainly described in the context of a standard 20-foot freight container. However, it is remarked that the principles described below are also applicable to transportable bottling plants in general, e.g. integrated into a 30-foot, 40-foot or other freight container, and many principles such as for example the furnace air supply, the bottle forming unit and the system for drying the wet circuit are even applicable to non-transportable bottling plants.

Firstly, a preferred lay-out or floor plan of a transportable bottling plant will be described with reference to FIGS. 1-5.

According to the invention, a preferred embodiment of which is shown in FIGS. 1-4, a transportable bottling plant is provided which is incorporated into a 20-foot freight container 100, which is preferably a standard 20-foot freight container. The internal volume of the container 100 is divided into separate rooms, one of which being a bottling room 107. A preform feeder 118, a bottle forming unit 300 and a bottle filling and closing unit 119 are mounted in the bottling room 107. The preform feeder 118 is provided for feeding preforms to the bottle forming unit 300. The bottle forming unit 300 comprises a heater or furnace for heating the preforms and a moulder for moulding the preforms into bottles by making use of pressurized air. The filling and closing unit 119 comprises a filling unit for filling the bottles with a liquid/fluent product and a closing unit for closing the bottles with caps.

An air compressor 113, an air conditioning unit 115 and possibly also a power generator 111 are mounted inside the internal volume but outside the bottling room 107. The air compressor is provided for supplying pressurized air to at least the bottle forming unit 300. The air conditioning unit 115 is provided for conditioning the air present in the bottling room 107. The power generator 111, if present, is provided for generating electric power for the units of the transportable bottling plant, but is not essential—the units may also be powered by connection to e.g. an electricity network if this is available, in which case the power generator may be omitted. For this purpose, a power socket (not shown) may be provided for example in the first technical room 108, to which all units are electrically connected.

According to the invention, a preferred embodiment of which is shown in the figures, the internal volume (separate from the bottling room) comprises at least a first 108, second 109 and third technical room 110, separated and sealed from each other. The first technical room 108 is adapted for mounting the power generator 111 (i.e. the first technical room provides sufficient space for a power generator capable of supplying sufficient power, e.g. having minimal dimensions of L×W×H=0.9×2.3×1.0 meter). The air conditioning unit 115 is mounted in the second technical room 109 and the air compressor 113 is mounted in the third technical room 110.

In embodiments according to the invention, the freight container may be provided with personnel access 120 to the bottling room 107 separate from personnel access to the first technical room 108 and preferably also separate from personnel access to the second 109 and/or to the third technical room 110.

Figure 4:
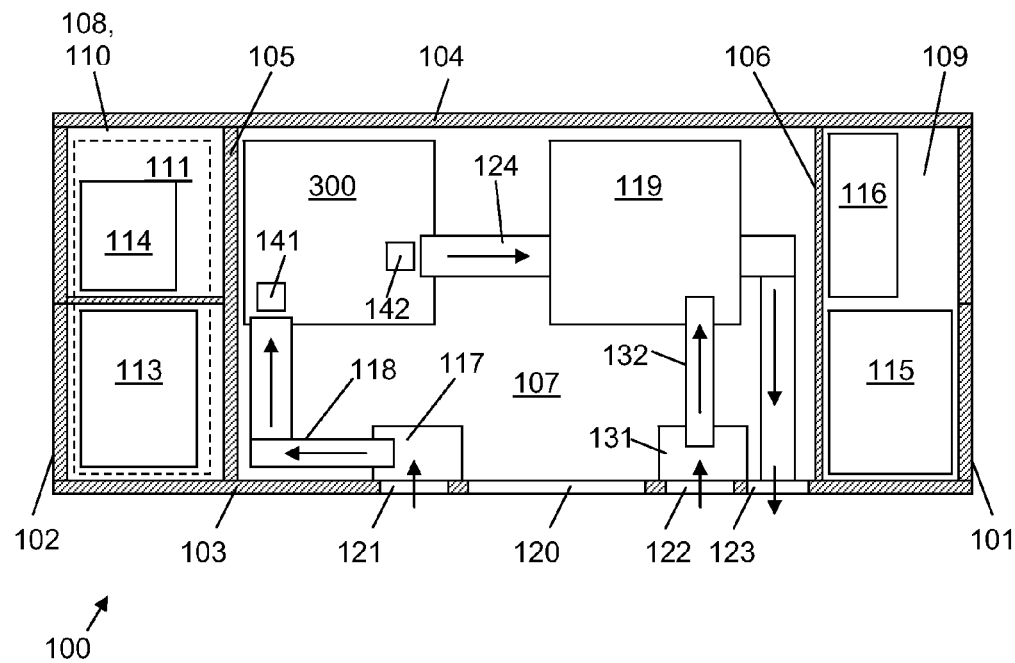
FIG. 4 shows a schematic view of a preferred floor plan for a bottling plant according to the invention.

In embodiments according to the invention like the one shown in FIG. 4, the first technical room 108 may be provided at one short side 102 of the freight container and the second technical room 109 may be provided at the opposite short side 101 of the freight container. An additional advantage can thus be obtained that the power generator exhaust and fresh air intake of the air-conditioner are located as far as possible from each other (the opposite side of the freight container), minimizing the risk of ingress of fumes or exhaust gases via the air-conditioner system into the bottling room 107.

Figure 5:
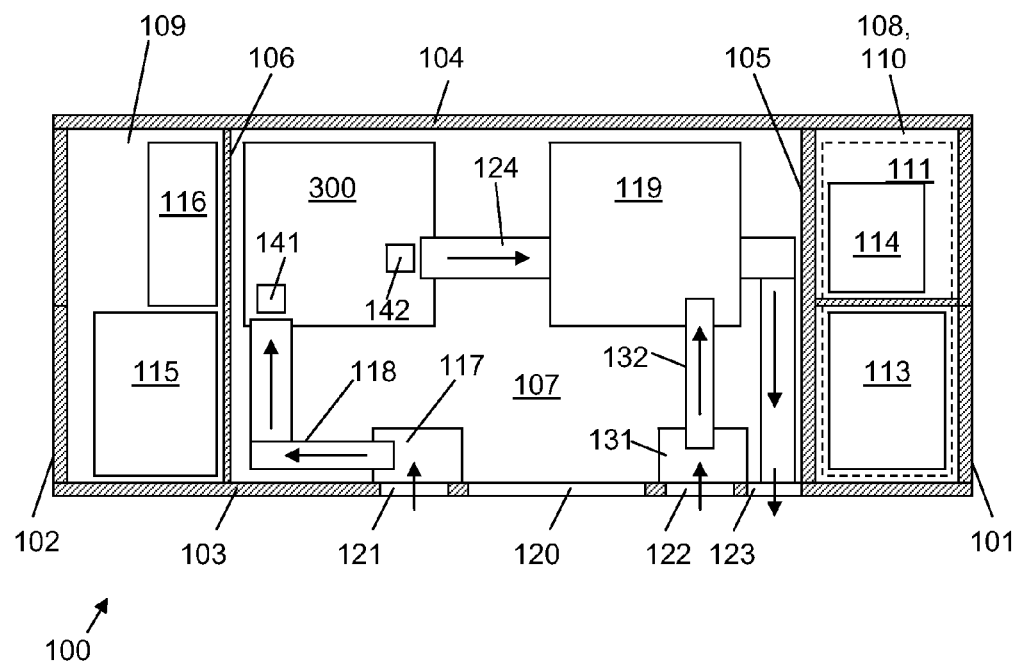
FIG. 5 shows a schematic view of another preferred floor plan for a bottling plant according to the invention.

In embodiments according to the invention, like the ones shown in FIGS. 4 and 5, the first technical room 108, the second technical room 109 and the bottling room 110 may be separated from each other by separation walls 105, 106 which span the entire width and height of the freight container. These rooms are located one after the other in longitudinal direction of the freight container, with the technical rooms preferably at the short sides 101, 102 of the freight container though this is not essential—all technical rooms 108, 109, 110 may also be arranged at the same short side of the freight container albeit with preferably separate accesses via the standard container doors and preferably other doors in the container sides 103, 104. As shown, e.g. the first 108 and third technical rooms 110 may be located above each other and may together take up substantially the entire width and height of the freight container. As shown, e.g. the second technical room 109, may alone take up substantially the entire width and height of the freight container.

In embodiments according to the invention, like the one shown in the figures, personnel access 120 to the bottling room and hatches 121, 122 for supplying the preforms, the bottle caps and the lock 123 for discharging filled bottles may be provided on the same side of the freight container, preferably a long side 103 of the freight container 100. It is customary that a tent is placed at the personnel access to the bottling room, to reduce the risk of dirt entering the bottling room when the plant is used in open air. An additional advantage can thus be obtained by locating all accesses for personnel to the bottling room on one side of the freight container, i.e. inside the same tent.

In the embodiment shown in FIG. 4, the power generator 111 and the bottle forming unit 300 may be mounted adjacent to each other on opposite sides of the first separation wall 105. In other embodiments according to the invention, the power generator and the bottle forming unit 300 may be mounted in the freight container with at least one other unit of the bottling plant mounted between them, preferably the bottle forming unit 300 being located in a corner of the bottling room 107 which is opposite the part of the bottling room adjacent to the first technical room 108, where the power generator 111 is mounted, i.e. in a corner at the second separation wall 106. This can be achieved by switching the technical rooms in the floor plan of FIG. 4, as shown in FIG. 5. Preferably the bottle forming unit 300 is further located in the corner of the bottling room 107 which is opposite the part of the bottling room wall closest to the internal combustion engine, which is typically the heavier part of the power generator 111 as compared to the electrical generator part. The inventors have found that the bottle forming unit 300 and the combustion engine of the power generator are usually the heaviest pieces of equipment which need to be fitted into the freight container. By moving these two equipment items further apart, preferably as far apart as possible, the weight distribution of the freight container comprising the bottling plant is improved, which facilitates handling during transport and increases safety.

In embodiments according to the invention, one or more windows, preferably with hatches 121, 122, may provided at the side of the container adjacent to the recipient 117 of the preform feeder 118 and/or a cap recipient 131 of a cap feeder 132, which feeds bottle caps to the filling and closing unit 119, and/or a handle recipient (not shown) of the filling and closing unit 119. This hatch or hatches are provided for user supply of the "consumables", i.e. the plastic bottle preforms, bottle caps, bottle handles and/or labels, from outside the bottling room 107. A lock 123 is preferably provided at the side of the container adjacent to the filling and closing unit 119, for passing filled and closed bottles towards the outside of the bottling room. As a result of these hatches and the lock, operation of the transportable bottling plant as a "closed box" may be obtained, which means that operators do not have to enter the bottling room while the plant is in operation to supply the consumables and to remove the filled and closed bottles. This brings the advantage that hygiene may be enhanced, as the risk of contamination by the operator or consumable packaging entering the bottling room is minimised. These hatches and the lock are preferably provided at the same container side of the freight container, such that the operator does not need to move far between the points of supply of the preforms, the bottle caps, the handles and the labels, and the point where the filled bottles are leaving the freight container. It is preferred that these hatches and lock are provided close to, and more preferably at the same side of, a door 120 through which the operator has access to the bottling room, for intervention such as in case of emergency. Preferably these access facilities, hatches and lock are provided at one of the longer sides of the freight container, such that a shelter or tent may be provided at that side, preferably over the total length thereof, for providing protection for the operator as well as any storage of consumables and/or filled bottles. Such shelter may also reduce the risk of contamination of the bottle room when the access or any hatch needs to be opened.

The inventors prefer to arrange the equipment in the container 100 such that the technical rooms 108-110 are located at the shorter sides of the freight container, with full fledged doors on both sides such that full access is provided for servicing the equipment mounted in those technical rooms, but also for assembly of the bottling plant ancillary equipment, and/or for disassembly and possible replacement of a particular equipment items which became faulty. With the bottling room 107 in between the two technical rooms 108, 109, an access door 120 may readily be located in one of the longer sides 103 of the freight container at a location from where all equipment items in the bottling room may be easily accessible and even serviceable with a minimum of space which needs to be reserved inside the bottling room 107.

With the improved lay-out according to FIGS. 1-4, as well as the alternative lay-out of FIG. 5, the following division into hygiene/safety levels is achievable, wherein level 1 has the lowest and level 5 the highest hygiene requirements and each level may mean a separate room/compartment in the container:

Level 1: power generator 111;
Level 2: compressor 113, air dryer 114;
Level 3: product treatment, buffering and/or processing facilities (e.g.
freshwater polishing or purification, . . . ) 116, centralised product (e.g. freshwater) feeding and discharging system 129;
Level 4: air conditioner 113, chiller;
Level 5: bottling room 107.

The chiller is provided for cooling a chilling agent which may be supplied to the mould parts and the perform necks in the oven, for cooling these parts during use.

In embodiments according to the invention, like the one shown in the FIGS. 1-4, the freight container 100 may be provided with personnel access to the bottling room 107 separate from personnel access to the first technical room 108 and preferably also separate from personnel access to the second 109 and/or to the third technical room 110. This access arrangement further improves the separation of the activities in the technical rooms with those in the bottling room, and thus further facilitates the maintenance of the desired high hygienic standards in the bottling room.

In embodiments according to the invention, like the one shown in the FIGS. 1-4, the first technical room 108 may be provided at one short side 102 of the freight container, the second technical room 109 preferably being provided at the opposite short side 101 of the freight container. The inventors have found that this is a very convenient layout, convenient not only for assembling the bottling plant, but also for servicing the equipment in the various technical rooms or spaces of the freight container.

In embodiments according to the invention, like the one shown in the FIGS. 1-4, the power generator 111 comprises an internal combustion engine which is provided with direct or indirect air cooling, whereby the hot air outlet of the air cooling is provided in the freight container wall, preferably the air intake of the engine air cooling being provided inside the first technical room 108. The inventors have found that it is even more desirable to mount a power generator which is driven by an internal combustion engine in a technical room separate from the space containing the air compressor and the space containing the air conditioning unit. Both the latter pieces of equipment would be sensitive to any exhaust gasses leaking from the internal combustion engine and/or any lubricating oil particles or aerosols which may be emitted by the engine. Also the heat from the power generator may affect the air compressor and the air conditioning system.

In this embodiment, the bottling plant may further contain a fuel tank 125, whereby the inventors prefer to mount the fuel tank in the first technical room 108 or in a fourth technical room provided as part of the freight container 100, preferably in the first technical room, and even more preferably underneath the basis supporting the power generator 111. The fuel tank 125 for the internal combustion engine of the power generator 111 may be preferably provided underneath a forklift compatible base and preferably attached thereto, for easy removal from the first technical room. The inventors have found that this location of the tank is the best place as part of the freight container for mounting the fuel tank, providing the least risk for contamination of the sensitive parts of the bottling plant and its ancillary equipment with any fumes or aerosols from the fuel, such as during filling the fuel tank.

In embodiments according to the invention, like the one shown in the FIGS. 1-4, the bottling plant according to the present invention may further comprise a water treatment unit 116 which is preferably mounted in a space different from the first technical room 108, preferably the water treatment unit being mounted in the second technical room 109. The provision of a water treatment unit provides the capability to use a broader range of fresh water sources as raw material to the bottling plant. The inventors prefer to mount this water treatment plant in the second technical room 109, as its presence does not jeopardize the operation thereof, nor does the air conditioning unit 115 possibly jeopardize the operation of the water treatment unit.

In embodiments according to the invention, like the one shown in the FIGS. 1-4, the bottling plant further comprises means for maintaining a pressure in the bottling room which is above the pressure of the atmosphere surrounding the freight container, preferably at least 0.5 mm H2O and optionally at most 3.5 mm H2O above the surrounding atmosphere (i.e. about 5 Pa to about 35 Pa overpressure or gauge). The overpressure brings the advantage that the risk for contamination of the bottling room from the outside is strongly reduced, and that compliance with the international regulation on hygiene may be more readily maintained.

In this embodiment, the inventors prefer that the means for maintaining the pressure in the bottling room is at least partially provided by the air conditioning unit 115, preferably the air conditioning unit being provided with a first air intake for recycling air from the bottling room 107 and a second air intake from outside the bottling room 107 for bringing in fresh air, preferably from inside the second technical room 109. The inventors have found that this is a very convenient method of providing an overpressure in the bottling room 107, in particular because the air conditioning unit is mounted in a technical room separate from the power generator, and any fresh air intake by the air conditioning unit may readily occur in the second technical room itself. The air coming into the second technical room may readily be filtered on its way into the second technical room, with a large area filter which brings only a negligible pressure drop.

In the embodiment shown in FIGS. 1-4, the filling and closing unit 119 comprises product inlet and outlet piping connected to product inlet and outlet connectors which are provided in one of the sides of the container, in particular in a centralised product infeed and discharge system behind hatch 129 in the container wall part of the second technical room 109, so that they are accessible from outside the bottling room. The product inlet connector may be provided for feeding the product with which the bottles are to be filled. The product inlet and outlet connectors together may also be used to create a closed loop for a cleaning product (clean-in-place system). So by means of the product inlet and outlet connectors accessible from outside the bottling room, both the product supply during operation and the supply and discharge of cleaning product during cleaning may be effected from outside the bottling room. This brings the advantage that hygiene may be further enhanced, as the risk of contamination by operators entering the bottling room is minimised in view of the fact that there is no need for an operator to enter the bottling room for the supply of either the product with which the bottles are to be filled or of any cleaning product, nor for the disposal of any waste from the cleaning step. This further brings the advantage that any contact between the product and electrical components, such as for example fuses in the electrical cabinet (not shown) which may for example be located in the bottling room 107 or, preferably, in one of the technical rooms 108-110, preferably the second technical room 109, can be avoided, which can make it easier to obtain an explosion proof plant 100 if required, suitable for example for bottling with a combustible or flammable product.

In another embodiment, the filling and closing unit 119 comprises a system for treatment of the product with chemicals before filling the bottles, the product treatment system optionally comprising a chemicals supply piping connected to a chemicals inlet connection provided in one of the sides of the container, for example behind the same hatch 129, so that it is accessible from outside the bottling room. So by means of the chemicals inlet connection accessible from outside the bottling room, the supply of chemicals for the treatment of the product in the product treatment system may be effected from outside the bottling room. This brings the advantage that hygiene may be enhanced, as the risk of contamination by operators entering the bottling room is minimised in view of the fact that there is no need for an operator to enter the bottling room for the supply of the chemicals for the product treatment.

The bottle forming unit 300 may be provided with a cooling circuit for circulating a cooling liquid through parts of the bottle forming unit, in particular at least one and preferably both halves of the bottle mould. A cold source or a chilling device for cooling the cooling liquid may be located in the second technical room 109.

The present invention may operate with any suitable thermoplastic for moulding bottles. The list of suitable thermoplastics is too long to enumerate, but the more appropriate thermoplastics are also the more common ones, such as polyvinyl chloride, polyethylene, polypropylene, and polyesters, in particular polyethylene terephthalate (PET), which is preferred. The person skilled in the art may readily adapt the bottling plant to the thermoplastic which is selected, such as adapting the desired preheat temperature range to for instance the glass transition temperature of the selected material. Furthermore, the bottling plant can also be adapted for operation with preforms in biodegradable materials, such as polylactic acid (PLA) or other.

The transportable bottling plant shown in FIGS. 1-4 is integrated into a container 100, in particular a standard ISO 20 ft container. In this way, the plant is adapted for being quickly transported to a place of need, which can for example be a place struck by a calamity, a remote place where military operations take place (e.g. desert), a stationary bottling plant which has insufficient capacity to meet the demand, or other.

The container 100 has a front side 101 opposite a back side 102, which form the shorter sides of the container, and two opposite lateral sides 103 and 104, which form the longer sides of the container. The container 100 has separation walls 105 and 106 which divide the interior of the container into a bottling room 107, and at least a first technical room 108, a second technical room 109 and a third technical room 110. The bottling room 107 contains all the electrically powered units for manufacturing closed and filled drinking water bottles starting from a supply of consumables, in particular plastic bottle preforms, bottle caps, possibly bottle carrying handles and labels, and a supply of drinking water. The first technical room 108, shown in FIG. 1, contains the electric power generator 111 for generating the power to be consumed by most of the other equipment items of the bottling plant and ancillaries.

Above the first technical room may be provided an extra separate compartment, representing the third technical room 110, separated from the first technical room by means of an extra floor 112. This floor may then be provided with seals such that the third technical room is sealed from the first technical room when the doors of freight container are closed. The first and the third technical rooms may be provided with individual air intakes, preferably provided with respective air filters, see e.g. filter 126 in the side wall of the container, or filters through the container doors (not shown). Waste heat from the power generator may be pushed out of the first technical room, preferably also out of the freight container via grid 127 in the side wall of the container, by means of a cooling fan, optionally through a "radiator" in which a liquid for cooling the internal combustion engine of the power generator is relieved of its excessive heat before being returned to the engine. This fan provides extra draught in the first technical room, possibly in addition to the draught which may be provided by the air intake of the internal combustion engine, if this engine takes its combustion air from the first technical room itself. This brings the advantage that the air for the combustion is already filtered a first time when entering the first technical room, so that the combustion air filter of the engine itself may be provided simpler and smaller and/or that the operating reliability of the engine is improved, in particular in highly dusty environments.

The third technical room 110 contains air compressor 113 for supplying pressurised air, which compressor preferably is a two-stage three cylinder reciprocating compressor. The third technical room may further comprise the compressed air dryer 114 for cooling the air from the compressor, in case of a multistage air compressor the cooler may comprise an intercooler for cooling the air from the first compressor stage, separating any condensed water from it, and returning it to the second compressor stage. When the compressor has more than two stages, corresponding additional intercooling may be provided. The air from the last compressor stage is preferably also cooled before further treatment and storage. This brings the advantage that extra humidity may be condensed and separated off, such that it becomes easier in a later stage to achieve the desired low dew point required for complying with the regulations of compressed air for the production of food and stimulants. Separating off condensed water is preferably performed by means of an electronically level-controlled condensed removal apparatus ("ECO-Drain"). Further treatment of the compressed air may comprise at least one and preferably all, of one or more pre-filtration, fine filtration, microfiltration and after-filtration steps for separating solid particles and aerosols including oil-aerosols of various sizes at appropriate places in the process, a step for the reduction of the dew point of the air to 4° C. or below, preferably by means of a refrigerated dryer, an activated carbon adsorption step for further scavenging undesired components, such as oil vapours, and these steps not necessarily being in this sequence. The compressed air dryer 114 may be provided with a fan pushing the hot environment air from the cooler through a grid in the outer wall of the technical room, preferably also the wall of the freight container, and provide for additional air draught in the technical room.

The second technical room 109 contains the air conditioning system 115 for conditioning/cooling the air in the bottling room 107. It has, in the embodiment of FIG. 3, a fresh air intake through filter 128 in the side wall of the container and an air discharge 130 through the ceiling of the container. The inventors have found that it is very important that the atmospheric conditions in the bottling room remain relatively constant. Primarily the bottle forming step is very sensitive to being fed preforms of which the bodies are heated uniformly and at a temperature in the correct range. When excessive temperature deviations occur in the preform at the moment of forming the bottle, the process may fail in many aspects. The plastic of the bottle may loose its transparency, and an opaque bottle may be formed. The bottle may have mechanical weak spots, show cracks or even burst. The neck of the bottle should not be exposed to the same temperature, but preferably remains shielded and cool during the preheating step. This is because when heated it may deform such that the bottle cap does not fit anymore and the bottle cannot be sealed properly, such that the hygienic quality of its content cannot be maintained. The inventors have found therefore that a correct sizing and a correct functioning of the air conditioning unit 115 is important for a flawless operation of the bottling plant. The inventors have also found that it is desirable to avoid as much as possible external influences which may affect the conditions in the bottling room. The influences to be avoided as much as possible include influences with a continued effect, but even more important influences which are temporary and unpredicted, because these are more difficult to cope with by the air conditioning unit. This is a strong additional reason for eliminating reasons for operator entry into the bottling room during operation. It is a prime reason why the consumables are preferably fed through hatches 121, 122, which may be closed and sealed when not needed, and also a reason for providing a lock 123 through which the filled bottles leave the bottling room.

The front side 101 and back side 102 of the container are preferably provided with conventional container doors (not shown) by means of which the two or more technical room may be closed off for the purposes of transportation.

By the division of the freight container into the bottling room 107 and the technical rooms 108, 109, 110, conditions may be achieved in the bottling room 107 which comply with international regulations on hygiene, safety, heat and noise.

The air compressor 113 may for example be provided for supplying pressurised air within a range of for example 15-25 bar (though other values may be used as well), which implies that the plant may readily be used for making bottles up to 5 liter and even higher from suitable preforms, and this at acceptable production speeds. The bottling plant of FIG. 1 can for example be used for making 1, 1.5 or 2 liter bottles, or any volume from 0.25 up to 5 liter or even larger. In particular, for each bottle size a different mould is used, and a handle applicator is usually not used for the smaller bottles because the smaller bottles typically do not need to be provided with a handle.

As a result of the improved lay-out, the bottling plant can be made suitable for operation in relatively extreme atmospheric conditions (e.g. 55° C. and 85% humidity). The more efficient use of space and the provision of the separate technical rooms provide sufficient space for ancillary equipment of sufficient power.

The separation wall 105 between the first technical room, optionally including the third technical room, and the rest of the freight container may provide both a thermal and an acoustic isolation, such as between the bottling room 107 and the technical room 108. The wall preferably comprises a rockwool plate of 80 or 100 mm, such as for example the "Marine Slab 55" available from manufacturer Rockwool Technical Insulation NV. The inventors have found that this insulates the "hot" ancillary equipment, i.e. the internal combustion engine and the air compressor, from the bottling room 107. By the extra thermal insulation, the duty requirements for the air conditioning unit may be reduced, its operation becomes more reliable, and its power consumption can be reduced. The wall or floor 112 separating the first and the third technical rooms does not need to be insulated for sound nor for heat transfer, as both technical rooms contain "hot" equipment.

The separation wall 106 between the second technical room 109 and the bottling room 107 does not need the same insulation thickness. The second technical room 109 does not contain "hot" ancillary equipment, nor equipment which is very noisy. A minimum of thermal insulation, similar to what is foreseen in the other walls of the bottling room excluding separation wall 105 is sufficient. This brings an extra improvement of space utilization.

The air conditioning system of the bottling plant of the present invention may be of the split type having a separate condenser unit 115 in the second technical room and an evaporator unit (not shown) inside the bottling room 107. Alternatively, the air conditioning system could also be a unitary system, mounted in the same compartment of the second technical room as the condenser unit 115 with then a grid towards the bottling room 107. The inventors have found, by bringing the cool air outlet of the air conditioning unit close to the bottle forming unit 300, that it is easier to accurately control the temperatures of the preforms, including the neck but evenly important the temperatures of the different zones of the preform body, and that the operating reliability of the bottle forming unit is thereby significantly improved. This brings an important contribution to an improved operating reliability of the overall bottling plant.

Generally, the following units are provided in the bottling room 107: a preform feeder 118 for feeding and orienting the plastic bottle preforms, a first transferring device 141, a bottle forming unit 300 for forming plastic bottles from the preforms and a filling and closing unit 119. The units may be organised around one large closed loop transporting unit, such as described in WO 2011/095464 A1, which may be arranged in a double file as shown or in a single file along the loop, which reduces the footprint of the bottling plant. Preferably however, the filling and closing unit 119 is a separate unit from the bottle forming unit 300, so that it is at all times avoided that any product comes into contact and could contaminate the carriers of the bottle forming unit and hygiene can be improved. The filling and closing unit 119 can for instance use a carousel for passing the bottles from one position up to the next. The bottle forming unit and its preheat unit may then operate around a smaller closed loop transporting unit, such as for instance described in US 2011/0302881 A1. This separation of the two operational steps may also provide more freedom in the layout of the equipment to be arranged in the bottling room. In the case of separated operation, a second transferring device 142 is provided for removing the formed bottles from the bottle forming unit 300 and for feeding these to the filling and closing unit 119. Together, these units provide a unit for every step in the bottling process, so that the bottling plant is able to run substantially without manual intervention. This also contributes to hygiene as no continuous presence of an operator in the bottling room is required. In the following, the units will be described in more detail.

The preform feeder 118 is similar to the one described in US 2011/0302881 A1 or WO 2011/095464, and comprises a recipient 117 for receiving and buffering plastic bottle preforms. The recipient 117 may be accessible via a first hatch 121 provided in the side wall 103 of the container. This first hatch 121 preferably has a door which pivots around its bottom side, and by opening ends up in a slanted position so that it may form a slide towards the recipient. The operator may readily throw in preforms from outside the bottling room 107. By emptying onto the slide boxes of preforms which have remained sealed until just before, high hygienic standards may be maintained with respect to the cleanliness of the fed preforms. The preforms present in the recipient may then be picked up by a conveyor belt and fed to an ordering unit. The ordering unit may then arrange the preforms with their neck pointing upwards onto a slide/hopper, on which the preforms are transported towards the bottle forming unit 300.

The first transferring device 141 may preferably comprise a 180° rotatable arm with a gripping mechanism, by means of which the preforms are picked up one by one at their neck and placed upside down, i.e. with their neck pointing downwards onto preform/bottle holders or "carriers" of the bottle forming unit 300. Turning the preforms upside down at this stage has the advantage that any dirt present in the preforms would be allowed to drop out. Alternatively the preforms may be dropped into position on a carrier, such as described in WO 2044/095464, but the drawback of such arrangement is that any strange object inside the preform is unable to drop out, and will remain in the preform and in the bottle which is formed therefrom.

The preform/bottle holders may also be called the "carriers". Typically about at their centre point, they comprise a mandrel, herein also called "holders 324" upon which the preform is placed by the first transferring device 141. The mandrel may be provided with an insert entering the preform neck, through which later the heated preform may be stretched and the bottle may be formed by blowing. Because of the pressure involved in the blowing, a seal may preferably be provided between the preform neck and the mandrel insert, typically a rubber seal, preferably a rubber o-ring. The inventors have found that it may be difficult to have the first transferring device 141, when it places the preforms onto the mandrel insert, also assure that the preform is pushed down sufficiently far over the mandrel insert in order to assure a good seal between the neck and the mandrel insert. The inventors therefore prefer to add an additional step, whereby the preform, after it has been placed on the mandrel over the mandrel insert, is pushed down further over the mandrel insert such that the seal is assured.

Of the bottle forming unit 300, one suitable embodiment is already shown in detail in FIG. 4 of US 2011/0302881 A1, which comprises an array of preform/bottle holders which are coupled in a semi-circular chain. The inventors have found that an improved space utilization may be obtained with the bottle forming unit 300 as shown in enclosed FIG. 7 comprising an array of preform/bottle holders which are coupled in a rectangular chain. The preform/bottle holders are preferably pushed stepwise from one position to the next by pushing apparatuses appropriately located around the chain or carriers, and guided by guiding elements which define the path of the chain. The semi-circular chain of US 2011/0302881 A1 may need not more than two advancers, one pushing the carriers along the straight part of the semi-circle, the second one pushing the carriers along the semi-circular part of the chain. The rectangular chain shown in enclosed FIG. 7 may need at least 4 advancers, one located at each corner for pushing the carriers into and further along the side downstream of the corner.

The rectangular transporter 302 of the preferred embodiment of the bottle forming unit 300 shown in FIG. 7 will be described further below in more detail.

When placed on their carrier as part of the chain, and after pushing the preforms well over the mandrel inserts to assure they are correctly in position and well sealing around the mandrel inserts, the preforms are moved into heater 205 for heating up the preforms to the extent that the material of the bodies of the preforms becomes mouldable.

The heating may be performed with any suitable type of heating elements. Suitable are for instance the electrically driven heating rods described in WO 2011/095464. With such heating rods, most of the heat transfer to the preforms occurs by convection.

The inventors however have found that the heat transfer by convection is more difficult to control and maintains a significant risk for non-uniform heating of the preforms. The inventors prefer to use a radiation heated oven or furnace for heating the preforms, e.g. by means of heating lamps. The inventors have found that this means of heating allows a better control of the heat distribution over the various zones of the preform body, which should be heated as uniformly as possible with the temperatures all in a prescribed range, a range which depends on the thermoplastic which is selected for the preform. The inventors have found that it is also easier to shield the preform necks from radiation heat, without requiring extra cooling of the necks in order to keep them below the desired temperature so that the risk for problems during the forming step, or downstream, may be minimised. The inventors prefer to monitor and control the preform heating in multiple zones, in order to achieve the desired uniform heating. These lamps may be longitudinal in shape and may be arranged on one side or on both sides of the preforms moving through the radiation furnace, parallel to the direction of movement, stacked vertically one above the other. Each lamp heats one heating zone, and the heating zones are thus preferably arranged vertically one above the other. The inventors prefer to control the power fed to the individual lamps, preferably to the lamp heating one particular zone in accordance with the temperature measured on the preform body part inside that zone. This temperature measurement is preferably done by Infrared (IR) temperature measurement.

The mandrels are preferably provided rotatable relative to the carriers which support them, and are more preferably rotated such that also the preforms rotate around a vertical axis during their path through the radiation furnace. The rotation of the preforms may be provided by any suitable means, but the inventors prefer to have mandrels provided with a gearwheel, similar to what is shown in FIG. 4 of WO 2011/095464 A1, the teeth of which grip into a chain or into other suitable element for receiving the teeth. The chain or other suitable element may be provided stationary inside the heating furnace, or may if desired be made to move in order to provide continuous rotation of the preform during the preheat, and to provide further control over the speed at which the preforms are rotating during their path through the furnace. With a stationary element receiving the teeth of the gearwheel, the preforms rotate in steps, with intermittent periods without rotation. This increases the risk for non-uniform heated preforms and hence a risk for faulty bottles and bottling plant malfunction. The inventors prefer to have the preforms move continuously, and preferably at a sufficiently high rate such that the effects of the stepwise movement of the carriers through the furnace is reduced and preferably becomes negligible.

During the path through the furnace, the inventors prefer to keep the preform necks significantly cooler than the bodies. The prime purpose of this is to avoid deformation of the neck during the bottle forming step, and malfunctioning of the downstream equipment. The inventors have found that with radiation heating it is easier to keep the preform necks cool, typically simply by properly placed heat shields. This is even simpler and easier with appropriate control of the air flow through the heating furnace and also with the preforms turned upside down.

The heater is preferably located at one straight part of the rectangular chain of transporter 302, typically along one of the longer sides of the rectangle. With radiation heating, the inventors prefer to use heating lamps of standard size. The heating power of the lamps, the speed at which the preforms may move through the heating furnace, the temperature which the preform should have before being formed into a bottle, the length of the lamps, the number of them arranged optionally in series, all together determine the minimum length of the furnace, and hence the minimum length of that side of the rectangular chain.

The second transferring device 142 preferably comprises a 180° rotatable arm with a gripping mechanism, by means of which the bottles are picked up from the carriers one by one at their neck, turned over and placed upright, i.e. with their neck pointing upwards, if desired onto a transporter device 124 which passes through the filling and closing unit 119 up to lock 123.

The filling of the bottle is preferably performed in two steps: a prefilling step in which 70-80% of the bottle is filled, followed by a second finishing filling step, wherein the remaining 20-30% is filled and the bottle is filled to the desired height and/or volume. The two-step filling reduces the risk of overflow during the filling, and hence allows better housekeeping and thus also higher hygienic standards in the bottling room. It also reduces the need for operator intervention for cleaning up spilled liquid from the bottling room.

The filling and closing unit 119 preferably comprises a glass housing in which UV lamps (not shown) are provided for treatment of the drinking water, air, caps and bottles, and in which the filling operation takes place and the caps are screwed onto the bottles. Such UV treatment and the filling and closing operation are known from stationary bottling plants and therefore need no further description here. The filling and closing unit 119 has a cap feeder 132 which feeds the caps from a cap recipient 131 into the closed filling and capping unit 119. The cap recipient is accessible via a second hatch 122 in the side 103 of the container, so that no operator is required to enter the bottling room in order to supply caps to the cap recipient 131. The filling and closing unit 119 may further have a handle recipient for feeding bottle carrying handles to a handle applicator (not shown). The filled and closed bottles exiting the closed filling and capping unit 119 on the transporter device 124 then may pass a labeller (not shown) for applying a label to the bottle and optionally also printing a code identifying lot number and date onto the bottle. The finished bottles may be transferred from the transporter device 124 inside the bottling room through lock 123 in the side of the container, towards an accumulation device (not shown) outside the bottling container for further handling operations.

With respect to FIG. 6, a preferred air supply and discharge system for a bottling plant according to the invention will now be described.

As mentioned above, the bottle forming unit 300 is mounted in the bottling room 107 of the bottling plant 100. The bottle forming unit comprises a furnace 204 for heating the thermoplastic bottle preforms in a heating compartment 205, a bottle former (herein also called "moulder") for forming the heated preforms into bottles and transporting means for transporting the bottle preforms fed to the transporting means by the preform feeder 118 through the heating compartment 205 and into the bottle former and further transporting the formed bottles to the bottle filling and closing unit 119 and/or a second transferring device 142 for transferring the bottles to a separate bottle filling and closing unit 119.

The furnace 204 preferably comprises a fresh air inlet conduit 206 leading from the outside of the bottling room 201 to the heating compartment 205 for leading fresh air from the outside of the bottling room 201 to the heating compartment 205. The fresh air inlet conduit preferably opens to an inlet behind a hatch 219 (see FIG. 3).

As shown, the fresh air inlet conduit 206 leads from the outside of the freight container 100 to the furnace 204, more in particular to the heating compartment 205, for leading fresh air from the outside of the freight container 213 to the furnace 204, more in particular the heating compartment 205. Although the fresh air conduit 206 could also lead from for example one of the technical rooms 108-110, this is less desirable as in such configuration there is an increased risk that undesired substances enter the heating compartment.

Figure 6:
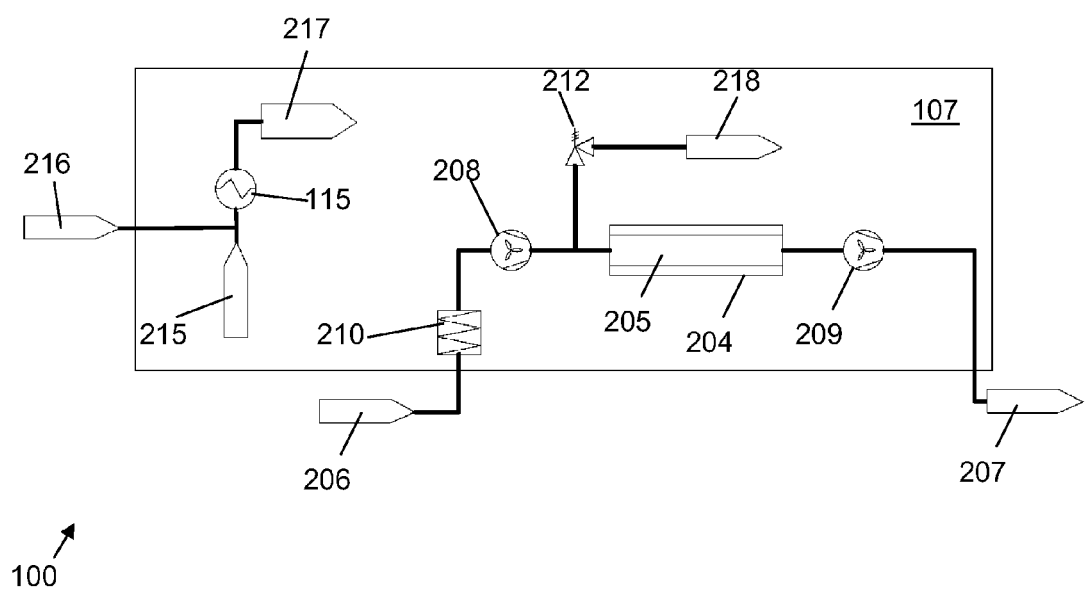
FIG. 6 shows a schematic view of a preferred air supply and discharge system for a bottling plant according to the invention.

As can be seen in FIG. 6, preferably, the bottling plant 100 further comprises a filter 210 for filtering the fresh air taken in through the fresh air inlet conduit 206. Although such a filter decreases the risk that unwanted objects enter the heating compartment 205, the filter 210 is not critical and may be omitted. Also, the preferred type of the filter 210 may depend on, for example, the environment wherein the freight container is positioned and/or the nature of the air which is conducted through the inlet conduit 206.

To provide fresh air to the heating compartment 205, a forced draft fan 208 is provided. Although the forced draft fan 208 may be omitted, in which case the fresh air enters the heating compartment 205 through the inlet conduit 206 by, for example, diffusion, the forced draft fan 208 preferably is provided to improve or to control the provision of fresh air to the heating compartment 205.

Preferably, as shown in FIG. 6, the furnace 204 also comprises a hot air exhaust conduit 207 leading from the furnace 204 towards the outside of the bottling room 201, so for leading hot air from the furnace 204 to outside the bottling room 201. This allows that typically no hot air from the heating compartment is enters into the bottling room 107, which could possibly decrease the hygienic conditions in the bottling room and/or be an extra burden for the air conditioning. As shown in FIG. 6, the hot air exhaust conduit 207 preferably leads from the furnace 204, more in particular from the heating compartment 205, to the outside of the freight container 100, preferably through an outlet behind a hatch 220 in the side wall 104. This is however not critical for the invention and the hot air exhaust conduit 207 may also lead from the furnace 204, more in particular from the heating compartment 205, to one of the technical rooms 108-110 of the freight container.

As shown in FIG. 6, the furnace preferably comprises an induced draft fan 209 for withdrawing hot air from the heating compartment 205. Although the induced draft fan 209 may be omitted, in which case the hot air leaves the heating compartment 205 through the exhaust conduit 207 by, for example, diffusion or convection, the induced draft fan 209 preferably is provided to improve or to control the withdrawal of hot air from the heating compartment 205, especially when the induced draft fan 209 and the forced draft fan 208 are provided together.

As shown in FIG. 6, the fresh air inlet conduit 206 may be provided with a pressure relief valve 212 for relieving any excessive fresh air from the conduit towards an outlet 218 towards the bottling room 107. The pressure relief valve 212 may also be connected to an outlet to release the excess air to outside the bottling room 107.

The pressure relief valve 212 may for example be a gravity controlled pressure relief valve with a counterweight for controlling its opening. However alternative systems based on, for example, springs, electronics, etc. may also be used.

By evacuating the hot air inside the furnace and replacing it with cooler air from outside the bottling room, it is possible to heat up the preforms mainly by radiation and less by convection. Thus, a more stable preform heating process can be ensured.

It has been found that close control of the temperatures inside the furnace depends on a sufficient and steady air flow through the furnace, as the air flow is also the preferred way for furnace energy to leave the air conditioned bottling room. The volume of air needed for extracting the amount of energy has been found to be significant. The inventors have found that providing the fresh air inlet conduit 206 brings the advantage that the volume of hot air discharge from the preform heating furnace does not, or to a lesser extent, need to be replaced with air from inside the bottling room 107. It has been found that the quality requirements of the air drawn into the furnace are less critical than those governing the bottling room atmosphere. It may be important that the air drawn into the furnace is for example dust-free, but its humidity and/or its temperature are typically unimportant or at least of a minor relevance as long as not excessively low or high.

By providing the forced draft fan 209 for providing fresh air to the heating compartment 209, one can better control the flow of air through the furnace. This can further bring the advantage of a possibility to size the two fans 208, 209 larger, such that the air flow through the furnace 204 can be higher and the temperature inside the furnace can be better controlled.

The furnace may comprise control means (not shown) configured to control the induced draft fan 209 and the forced draft fan 208 such that the amount of hot air withdrawn from the heating compartment 205 is smaller than or equals the amount of fresh air provided to the heating compartment. Such a configuration allows to further improve control of the air inside the bottling room as it can be prevented that air inside the bottling room is drawn into the furnace and through the exhaust such that, for example, the overpressure inside the bottling room could be decreased.

As shown in FIG. 6 and described above, the overpressure inside the bottling room 107 is maintained by the air conditioner 115, which takes air from an air inlet 215 in the bottling room and another air inlet 216 outside the bottling room, e.g. in the second technical room 109 and supplies conditioned air at overpressure through an outlet 217 in the bottling room 107. By providing the separate fresh air inlet conduit 206 with forced draft fan 208 towards the furnace, multiple air pressure stages can be achieved, with in particular overpressure of the bottling room 107 with respect to the environment and further overpressure inside the bottle forming unit 300 with respect to the bottling room 107. Especially with filter 210 present, this can further improve hygiene of the bottle forming process.

Figure 7:
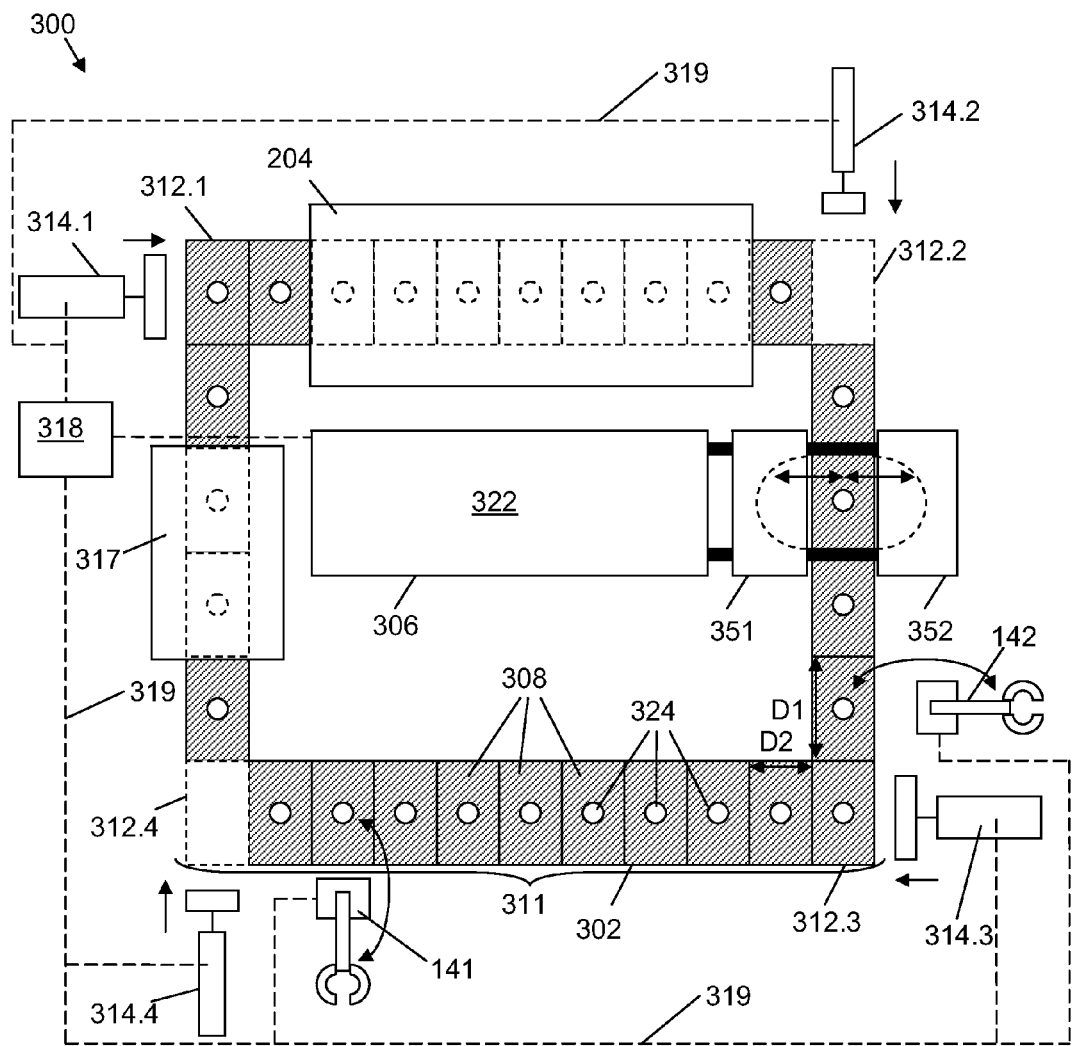
FIG. 7 shows a schematic view of a preferred embodiment of a bottle forming unit, for use in a bottling plant according to the invention.

With reference to FIGS. 7 and 8, a preferred embodiment of the bottle forming unit 300 will now be described. Movement of the various components is indicated by means of arrows.

The bottle forming unit 300 comprises a furnace 204 for heating the bottle preforms. The term "furnace" may be interpreted widely and may comprise various devices, e.g. a device as described herein, for increasing a temperature of the body of a preform. A furnace may herein also be indicated by using the terms "heating furnace", "oven", or "heater".

The bottle forming unit 300 further comprises a moulder 306 for moulding the heated preforms into bottles. The moulder preferably is a blow-stretch moulder, which may be regarded as a type of blow-moulder. A blow-stretch moulder may be preferred because it may enable forming relatively large bottles from relatively small preforms, as a result of the combined action of stretching and blowing. Furthermore, a blow-stretch moulder may be relatively compact. Because part of the extension of a preform into a bottle may be achieved by means of the stretching, a blowing pressure may be reduced. Thus, a size and/or power consumption of a part of a driving unit for driving the moulder may be reduced. Hence, a blow-stretch moulder may combine well with a bottle forming unit for forming bottles from bottle preforms that is to be positioned inside a transportable container, where relatively few space is available for placing the bottle forming unit and/or where a decrease in power consumption may be appreciated.

The moulder 306 comprises a driving unit 322 for driving, i.e. opening and closing the two mould halves 351, 352 of the moulder. When the mould is open, a formed bottle may be released from the mould and simultaneously a heated preform may be transported into the mould. Such driving unit may e.g. comprise a hydraulic, pneumatic or electric drive. Preferably, the driving unit 322 is positioned inside a loop 311 along which the carriers 308 can be transported, so that the space inside this loop is used efficiently. The driving unit may need to sustain relatively strong forces, because the mould needs to be kept closed in spite of the pressure of the blowing air inside the mould. The driving unit therefore is preferably relatively powerful and/or sturdy, and therefore may be relatively heavy and/or relatively voluminous. The inventors have found that fitting at least the driving unit, or at least part of the driving unit, inside the loop 311 may bring a reduction of the footprint of the transportable bottle forming unit when placed in the container.

The bottle forming unit further comprises the transporter 302 arranged for moving the bottles and/or the preforms. The transporter may alternatively be indicated herein by the term "transporting unit" or "transporting means". The transporter 302 comprises a plurality of movable carriers 308. The carriers 308 are arranged for carrying the preforms and/or the bottles. Thereto the carriers 308 are each provided with at least one holder 324 arranged for holding a preform or a bottle. Thus, each carrier 308 may be arranged for carrying at least one preform or bottle. The carriers 308 preferably have a substantially rectangular shape, preferably with rounded corners, though other shapes are possible. The holders 324 are preferably arranged for holding the preforms and/or bottles at a neck of the preforms and/or bottles. The holders 324 are preferably arranged for holding the preforms and/or bottles with the neck of the preforms and/or bottles directed downwards. On their way towards the furnace 204, the preforms preferably undergo an additional step to push them firmly onto the holders 324, herein also called "mandrels", and are preferably subject to UV light for sterilisation in UV light box 317. Preferably, in the furnace, the necks for the preforms are substantially shielded from heat supplied by the furnace. The furnace may e.g. be provided with heat shields and/or heating elements positioned to achieve such shielding. As a result, the necks may remain substantially undeformed during forming of a bottle from a preform. The transporter 302 further comprises guiding elements for guiding the movable carriers 308 along the loop 311. Such guiding elements (not shown) may e.g. comprise a rail to which the carriers may be movably mounted and along which the carriers may be transported, or guides between which the carriers may be transported.

The guiding elements define the loop 311 of carrier positions where a carrier may be positioned. The loop 311 as shown has four corners 312.$i$ (i=1, . . . , 4). However, in other variations of the embodiment, the loop may have more than four corners, e.g. six or eight corners with then e.g. hexagonal or octagonal carriers.

In FIG. 7, a rectangular loop is shown. A loop 311 having the form of a rectangle may combine well with positioning the transporter inside a container, in particular in a container having standardised outer dimensions corresponding to a standard shipping container, or, in other words, a standard freight container. However, alternatively, the loop may have another shape. For example, instead of being substantially straight corresponding to a rectangular shape, a part of the loop in between two corners may be curved. However, if such curvature is lacking, a speed with which the carriers can be moved may be increased. Movement along a substantially straight part of the loop may give lower friction forces between carriers and the guiding elements, and/or between neighbouring carriers, as compared to a loop wherein the carriers have to turn as they move along curved parts of the loop. Additionally, by having substantially straight loop parts, a longer life time of carriers, a lower need for lubrication, and/or a lower probability of early replacement of damaged carriers may be achieved. As illustrated in FIG. 7, the loop 311 is provided for moving the carriers 308 through the furnace 204, for moving the carriers from the furnace 204 to the moulder 306, and for returning the carriers from the moulder 306.

The loop may be provided for moving the carriers through the furnace 204 over a part of the loop that extends from one corner 312.1 of the loop to a next corner 312.2 of the loop, located directly downstream of said one corner. This distance is defined by at least the length of the furnace 204 along the loop. Thus, for a rectangular loop having two short sides and two long sides, the furnace may optionally be arranged along a long side and the moulder may be arranged along a short side, while the short side is preferably kept as short as possible taking into account the size of the moulder and the capability to remove the formed bottles from the carriers by means of the second transferring device 142 along that same short side.

The transporter 302 comprises at least four advancers 314.$i$ (i=1, . . . , 4). In an embodiment, an advancer may be formed as a pusher. An advancer may e.g. comprise a piston having a plunger or may comprise another pushing element. An advancer 314 is typically arranged for moving a carrier 308 positioned at a corner 312.$i$ away from that corner 312.$i$, as shown in FIGS. 8A-D. The carriers 308 are, in use, pushed stepwise from one carrier position to a next carrier position by means of the advancers. The rectangular loop shown in FIGS. 7 and 8 needs four pushers, one located at each corner for pushing the carriers into and further along a part of the loop downstream of the corner towards a next corner.

FIG. 8A schematically shows the transporter 302 in a situation where carrier positions at a first set of two diagonally opposed corners 312.2, 312.4 are free of a carrier 308. FIG. 8C schematically shows the transporter 302 in a situation where carrier positions at a second set of two diagonally opposed corners 312.1, 312.3 are free of a carrier 308. The number of carriers 308 the number of carrier positions may be adjusted so that at least two, and preferably at most two, i.e. preferably exactly two, carrier positions along the loop 311 are free of a carrier 308. Said at least two carrier positions may in use be positioned at diagonally opposed corners of the loop 311. Thus, at least two free, or, in other words, vacated, carrier positions may be positioned at diagonally opposed corners of the loop 311.

In use, by advancing a carrier 308 positioned at a corner 312.$i$ of the at least four corners away from that corner 312.$i$, a file of carriers 308 substantially abutting the carrier positioned at said corner 312.$i$ is moved away from that corner 312.$i$ and towards a next corner 312.$j$ located downstream of said corner 312.$i$ (i=1, . . . , 4 and j=2, 3, 4, 1)). Thus, as a result of the advancing, a trailing carrier of said file of carriers 308 is moved into said next corner 312.$j$. Instead of the term "file", the term "row" may generally be used.

FIGS. 8B and 8D show the transitional stages between FIGS. 8A and 8C, with each time the file of carriers 308 being advanced halfway between the corners 312.*i*.

The transporter 302 is provided with a controller 318, arranged for controlling the advancers 314.*i*. The controller is arranged for controlling the moment of advancing of the advancers 314. The controller is drawn in FIG. 7 together with data transmission lines 319, arranged for communicating controlling signals from the controller to the advancers, and possibly for receiving a feedback signal from the advancers to the controller. Such feed-back signals may e.g. relate to a position of the advancer, in particular to a position of a plunger and/or piston of the advancer.

As explained by FIGS. 8A-D, the controller may be arranged for simultaneously moving, by means of the advancers, carriers 308 positioned at the diagonally opposed corners of the loop from those corners. In that way, the time of advancing may be decreased compared with a situation wherein no advancers operate simultaneously. As a result, the production rate of the bottle forming unit may be increased. Thus, the controller 318 may be arranged to operate the advancers 314.*i* so that two advancers located at diagonally opposed corner positions of the loop operate substantially simultaneously. As a result of such operation, the two advancers vacate carrier positions at the diagonally opposed corners, i.e. at the corners where the advancers are located. The controller 318 is further arranged for advancing the carrier 308 positioned at the next corner 312.*j* subsequent to advancing the corner positioned at the first corner 312.*i*, so that alternating operation of the advancers 314.1 and 314.3 together alternating with 314.2 and 314.4 together may be achieved.

As shown in FIG. 7, the controller 318 may further have transmission lines 319 towards the moulder 306 and the first and second transferring devices 141, 142 of which the first is arranged for placing preforms onto the carriers and the second is arranged for removing formed bottles from the carriers. Thus, the controller 318 is capable of controlling operation of these components so that their operations occur at standstill of the respective carriers 308. Note though that the advancing of the carriers through the furnace 204 may occur simultaneously, or substantially simultaneously, with a bottle forming step in the moulder 306 and a formed bottle removal step at the second transferring device 142. Likewise, advancing the carriers 308 through the mould may occur simultaneously, or substantially simultaneously, with a step of placing a preform on a carrier by the first transferring device 141.

As shown in FIG. 7, the carriers 308 may have a first dimension D1 and a second dimension D2, the first dimension D1 being larger than the second dimension D2. The first dimension and the second dimension may be measured in mutually transverse directions. Preferably, the first dimension D1 is sufficiently large for allowing space for blown bottles on subsequent carriers. Preferably, the second dimension D2 is sufficiently large for allowing space for preforms on subsequent carriers, but is shorter so that the time of the preforms in the furnace is maximised. This may enable a gradual and/or uniform heating of the preforms in the furnace 204. More in general, a number of preforms per unit of length along the loop in the furnace may be larger than a number of bottles per unit of length along the loop on the side of the mould.

The inventors therefore prefer to keep a path from the moulder 306 to the point of removal of the bottle, i.e. to second transferring device 142, as short as possible. The inventors therefore prefer to move the carriers relatively fast on the path from the moulder up to bottle removal, yet they prefer to move the carriers at a lower speed during their path through the furnace. This may be achieved by providing the carriers 308 with the first dimension D1 and the second dimension D2 as described above. In preferably as few moving steps as possible, preferably in at most four steps (i.e. with at most three carrier positions in between), more preferably at most three steps (i.e. with at most two carrier positions in between) and even more preferably in two steps (i.e. with only one carrier position in between), the heated preforms are moved from a position just outside the furnace to a position suitable for blowing a bottle, namely the position in between the mould halves 351, 352.

The formed bottle is preferably removed from its carrier as soon as possible after it is formed, i.e. after as few steps as possible removed from the position of the carrier during the forming step, i.e. the "forming position". The inventors have found that removal of the bottle from the carrier may be provided from the position which is only two steps downstream of the forming position. The removal from this position allows improving the space utilization of the bottle forming unit 300.

With one empty corner position in a rectangular loop, four advancers would have to operate consecutively. Then, each advancer would have to wait before starting advancing until an advancer located directly upstream has performed and finished its action so that a vacated position is created. These actions by the advancers, and the advancers returning into their original position, takes time. Such consecutive operation requires a time corresponding at least with a time required for an advancers to execute one advancement summed for all advancers. This would impose a production rate limitation for the bottle forming unit and/or for the entire bottling plant.

The inventors have found that two empty corner locations along the rectangle may be provided at diagonally opposed corners. The inventors have found that in an arrangement having at least four corners and with two empty corner positions along the loop, the two advancers at diagonally opposite corners may operate simultaneously, optionally in concert with the two other advancers also operating simultaneously. With this operating sequence, the speed of movement of the carriers along the loop may be significantly increased. This may lead to a significantly increased production rate of blown bottles, and hence also of filled bottles. E.g. with the two empty corner positions, the bottle forming unit 300 can achieve a production rate of approximately 1800 bottles per hour.

The inventors prefer to leave the heated preforms on their mandrels and move them altogether into a suitable position for forming the bottle using the mould.

Thus, a loop enabling an improved space utilization compared to US 2011/0302881 may be combined with an improved production rate of bottles compared to WO 2011/095464. Such combination may be appreciated in view of a limited space available in a container, e.g. a standard 20 foot freight container.

In an alternative embodiment, the transporter of the bottle forming unit may also be composed of carriers comprising each time two preform/bottle holders, as known from WO 2011/095464, but with two open positions in the rectangle, so with the same operation as shown in FIGS. 7 and 8, and preferably also with the preforms held upside down. In such arrangement, the carriers are rectangular and oriented such that the two preforms move parallel to each other through the furnace 204, i.e. in two rows, and in one row on the side of the mould 351-352. In such arrangement, the mould may be arranged for forming two bottles simultaneously and also the preforms may be placed two by two simultaneously on the carriers and the bottles may be removed two by two from the carriers. Alternatively in such arrangement, the advancing of the carrier file on the side of the mould 351-352 may also occur in two substeps with a standstill halfway, so that the same mould 351-352 and second transferring device 142 as shown in FIG. 7 may be used, i.e. for handling the prefroms/bottles one by one.

Figure 9:
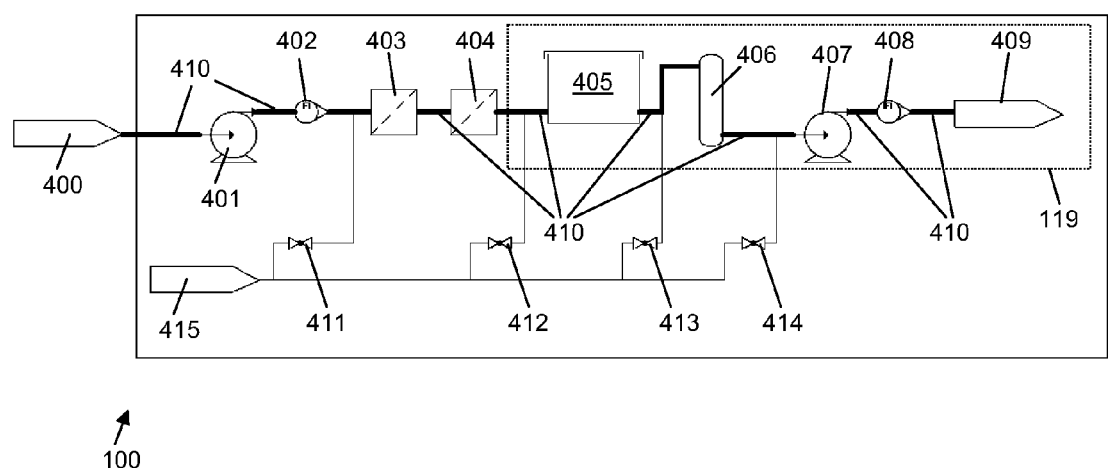
FIG. 9 shows a schematic view of a preferred system, for use in a bottling plant according to the invention, for drying a wet circuit of the bottling plant.

With reference to FIG. 9, a preferred embodiment of an arrangement for removing the liquid/fluent product from the product circuit of the bottling plant will be described.

The bottling plant 100 shown in FIG. 9 comprises a product inlet 400 for connecting a product supply for supplying the product to the bottling plant, a product circuit 410 comprising a plurality of conduits and components fluidly connecting the product inlet to at least one product outlet nozzle 409 (preferably two, see above) in the filling unit 119 at which the product is filled into the bottles, and an arrangement 411-415 for drying the product circuit after a period of operation of the bottling plant 100. In particular, this arrangement for removing residual product from the product circuit comprises at least one valve, in the embodiment shown four valves 411-414, with each time a connector for connecting a pressurized air conduit of a pressurized air conduit system, via which the product circuit 410 is connectable to a pressurized air supply 415 for forcing the residual product from the product circuit by means of pressurized air. In particular, the valves 411-414 are normally closed during the filling operation. After a period of operation, e.g. as soon as the filling operation is stopped and will not be resumed for a longer period of time, e.g. at the end of a day, the valves 411-414 are opened, so that pressurized air is released into the product circuit 410, preferably at many locations, in the embodiment shown four locations, so that the residual product is forced from the product circuit 410. In this way, rest product is removed and any bacteria growth in the product circuit during a period of standstill may be suppressed. The use of pressurized air over e.g. steam has the advantage that wear to the components of the product circuit 410 may be minimized and that the risk of a dead bacteria film remaining inside the product circuit may be minimized.

Furthermore, the use of pressurized air over e.g. steam has the advantage that the need for a separate unit to generate the steam is avoided, as the pressurized air supply 415 may conveniently comprise the air compressor 113 which is readily present on the transportable bottling plant for providing the pressurized air for the bottle blowing process. This pressurised air is of high quality, which further reduces the risk of wear to the components of the product circuit.

As mentioned above, the air compressor may be arranged for supplying pressurized air at a pressure within the range of 15-25 bar, which may be reduced to a pressure within the range of 2-10 bar, preferably 4-6 bar upon injection into the product circuit. As mentioned above, the air compressor 113 may be provided with the air dryer 114 for drying the pressurized air to a dew point for example below 5° C., preferably below 4° C. This can help to ensure sufficient removal of the residual product, e.g. water, from the product circuit to avoid bacteria growth during idle periods. In the case of water, a time period of e.g. about 2 minutes can be sufficient for removing the residual water as desired.

In particular, as shown in FIG. 9, the product circuit 410 may comprise, in succession from the product inlet 400 to the at least one product outlet nozzle 409, the following components: an infeed pump 401 for pumping in the product, a flow meter 402, at least one filter stage 403, 404 for filtering the product, a buffer tank 405 for buffering the product, a UV treatment unit 406 for subjecting the product to UV treatment, a dosing pump 407 for dosing the product towards the product outlet nozzle and another flow meter 408. For example, in case the bottling plant 100 is used for water, the filter stages 403, 404 and the UV treatment are used for obtaining potable water from freshwater and the flow meter 402 may be used for controlling a chlorine adding device, to add a correct dosage of chlorine to the freshwater. This filtering and treatment process is well known in the art and therefore needs no further description here.

As mentioned above, the product inlet 400 may be part of a centralised product infeed and discharge system provided in an outside wall part of the freight container, behind hatch 129.

The bottling plant 100 may be provided with an inlet and an outlet for circulating a cleaning product through the product circuit, which may for example be the product inlet and outlet of the centralised product infeed and discharge system, behind hatch 129. A heating device (not shown) may be provided at the product inlet for heating the cleaning product, so that its efficiency (e.g. the speed and/or the effectiveness of the cleaning operation) can be improved. Subsequent to the cleaning step, rinsing product (e.g. water or an alternative rinsing product) may be circulated through the product circuit for the purposes of rinsing the product circuit. The heating device, which may be provided at the product inlet, may also be used during this rinsing step to heat the rinsing product, so that subsequent drying of the product circuit may be facilitated (as the product circuit is brought to a higher temperature before drying).

Figure 10:
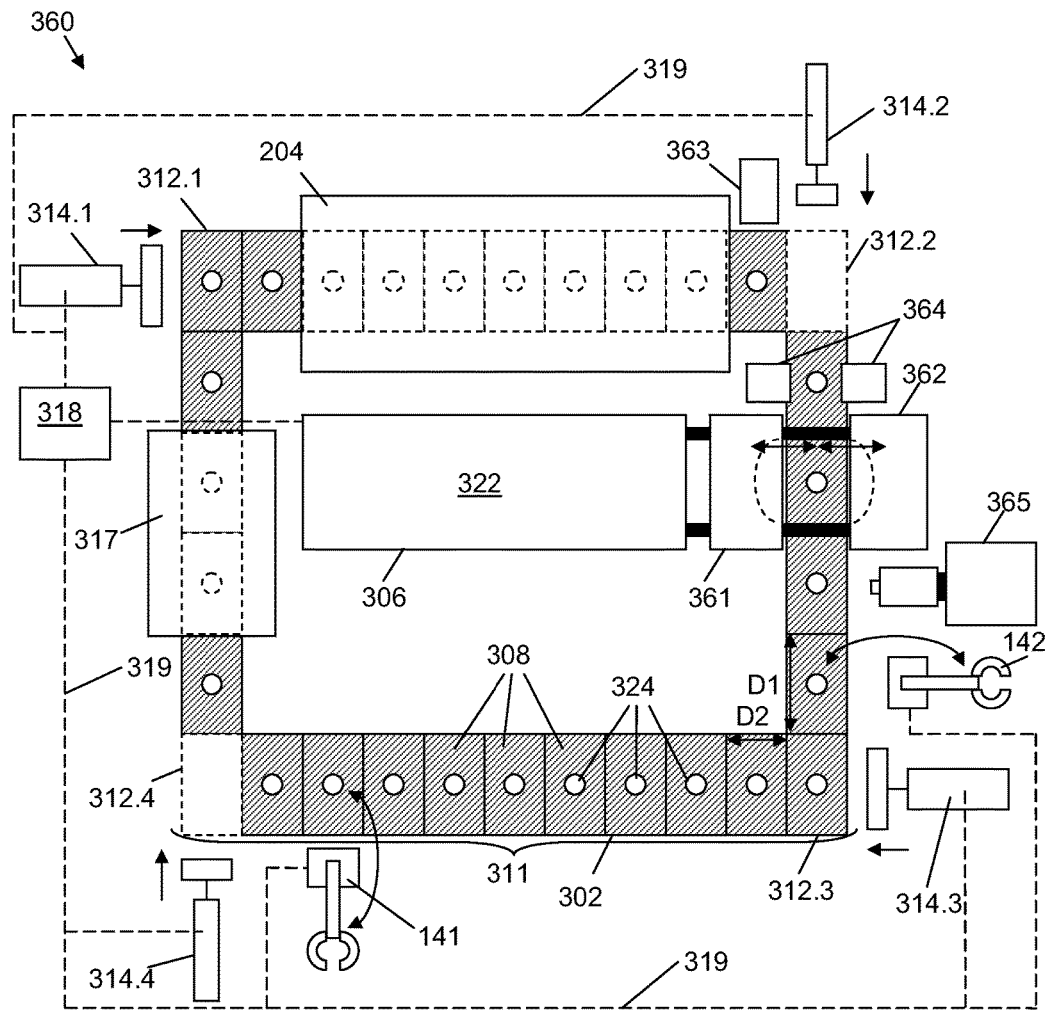
FIG. 10 shows a schematic view of another preferred embodiment of a bottle forming unit, for use in a bottling plant according to the invention.

With reference to FIG. 10, another preferred embodiment of the bottle forming unit 360 will now be described, which is in many respects similar to the bottle forming unit 300 of FIGS. 7 and 8. Like parts have been indicated with the same reference numbers and will not be described again in detail for the sake of brevity. The bottle forming unit 360 differs in the following aspects from the bottle forming unit 300.

The moulder 306 is the bottle forming unit 360 is fitted with mould halves 361, 362 for blowing bottles of oval shape, such as for example bottles for holding detergents. In order to ensure that the circular preforms expand correctly into the desired oval shape, additional preheaters 364 are provided at the carrier position right before the mould, for additionally preheating the sides of the preform facing the mould halves 361, 362 and facilitating expansion of the preform material in the direction parallel to the mould halves.

For this type of bottles, it is often a requirement that the bottle screw cap, which is in this case usually of the type having a snap closing part hingedly connected to a base part, is always placed in the same direction on the bottle. To this end, it is customary to provide a recess in the support ring of the preform neck, so that the preforms and in particular the screw-thread on the necks can always be oriented in the same way on the carriers before they are expanded to become the oval bottles. The orienting of the preforms is in the embodiment of FIG. 10 performed at the carrier position just outside the oven 204, by means of an orienting device 363. This orienting device is provided for rotating the holder 324, for example by acting on a gear provided on the carriers 308, and is equipped with a sensing element for sensing the recess on the preform. This principle, and suitable orienting devices are known in the art and therefore need not be further described here. Of course, the orienting device 363 may also be provided at other carrier positions between the furnace and the mould, for example in the corner position 312.2, or in case the preforms are not rotated in the oven (the necessity of which may depend on the heating principle used) the orienting device 363 may be even located at other carrier positions along the transporter 302.

It is remarked that the addition of the orienting device 363 and the additional preheaters 364 does not require a larger transporter 302 or more carrier positions as compared to the bottle forming unit 300 of FIG. 7.

The bottle forming unit 360 of FIG. 10 further comprises a bottle marking device 365 located adjacent to the transporter 302 at a carrier position downstream of the mould, for example the carrier position just after the mould. In this way, the bottles can be marked (i.e. provided with a mark containing e.g. a date and time of production, a product code, . . . ) while still on the transporter 302 of the bottle forming unit 360, which is convenient since a stable position of the bottles is desired for the marking step. It is remarked that the addition of the marking device 365 also does not require a larger transporter 302 or more carrier positions as compared to the bottle forming unit 300 of FIG. 7, so space can be saved.

An additional exhaust conduit may be provided leading from the carrier position at the bottle marking device 365, i.e. where the marking step occurs, to the hot air exhaust conduit, the additional exhaust conduit being provided for withdrawing fumes created upon marking the bottles by means of the bottle marking device 365, which may for example be a laser device. Such an arrangement has the advantage that the fumes created upon marking the bottles can be withdrawn from the bottle forming unit via the hot air exhaust conduit which has the induced draft fan, i.e. without additional effort.

A transportable containerized plant as described herein may provide a solution to reduce operating, personnel, fuel and transportation costs. It can be used for several applications:

Military: safe & less vulnerable to hostile activities.
Human Aid for refugee camps and remote areas: simple logistics to provide and/or securely store drinkable water.
Disaster relief for fast supply and/or secure storage of drinkable water.
Commercial applications: a transportable containerized plant may be used e.g. as back-up for a permanent plant; in case the latter has insufficient capacity, in case of break down or maintenance or to produce a new product without jeopardizing the production continuity of the permanent plant.

The advantages in the commercial field are numerous. In order to market products, companies are looking to start as soon as possible, giving the competition no time to enter the market. A containerized plant may be a fast solution. The containerized bottling plant according to the present invention brings an extremely short installation and start-up period, it may be prepared for immediate shipment worldwide and it may be arranged for ready operation, similar to a "plug-and-play" system. The risk on investment is low as compared to the risks involved with stationary plants because the bottling plant is transportable to other regions in case of local problems. The risk on quality problems is low since damage of products is inferior when products are bottled and/or packed locally compared to long distance transport. A containerized plant is an economic logistical solution since the costs are typically far inferior when a product is bottled and/or packed locally compared to long distance transport. Also, import taxes may be diminished in many occasions.

The invention claimed is:

1. A transportable bottling plant comprising:
a freight container having an internal volume divided into separate rooms, one of which being a bottling room;
a preform feeder, a bottle forming unit and a bottle filling and closing unit mounted in the bottling room;
an air compressor and an air conditioning unit mounted inside the internal volume but outside the bottling room;
wherein the preform feeder is provided for feeding preforms to the bottle forming unit;
wherein the bottle forming unit comprises a heater or furnace for heating the preforms and a molder for moulding the preforms into bottles using pressurized air;
wherein the filling and closing unit comprises a filling unit for filling the bottles with a liquid or fluent product and a closing unit for closing the bottles with caps;
wherein the air compressor is provided for supplying pressurized air to at least the bottle forming unit;
and wherein the air conditioning unit is provided for conditioning the air present in the bottling room,
and wherein the internal volume comprises at least a first, a second and a third technical room separated and sealed from each other, the first technical room being adapted for mounting a power generator provided for generating electric power for the units of the transportable bottling plant, the air conditioning unit being mounted in the second technical room and the air compressor being mounted in the third technical room.

2. The bottling plant according to claim 1, wherein the first technical room, the second technical room and the bottling room are separated from each other by separation walls which span the entire width and height of the freight container.

3. The bottling plant according to claim 1, wherein the first and third technical rooms are located above each other.

4. The bottling plant according to claim 1, wherein the first technical room is located at one short side of the freight container, the second technical room preferably being provided at the opposite short side of the freight container.

5. The bottling plant according to claim 1, wherein the freight container is provided with personnel access to the bottling room separate from personnel access to the first technical room and preferably also separate from personnel access to the second and third technical rooms.

6. The bottling plant according to claim 1, wherein personnel access to the bottling room and windows for supplying preforms, bottle caps and discharging filled bottles are provided on the same side of the freight container, preferably a long side of the freight container.

7. The bottling plant according to claim 1, wherein the bottling plant comprises the power generator, the power generator comprising an internal combustion engine which is provided with air cooling for which a hot air outlet is connected to an opening in the outer wall of the freight container, preferably the air intake of the engine air cooling being provided inside the first technical room.

8. The bottling plant according to claim 1, wherein the bottling plant comprises the power generator, the power generator being mounted on a forklift compatible base, so that the power generator is easily removable from the first technical room, a fuel tank for the internal combustion engine of the power generator being preferably provided underneath the forklift compatible base and being preferably attached thereto.

9. The bottling plant according to claim 1, further comprising means for maintaining a pressure in the bottling room which is above the pressure of the atmosphere surrounding the freight container.

10. The bottling plant according to claim 9, wherein the means for maintaining the pressure in the bottling room is at least partially provided by the air conditioning unit, preferably the air conditioning unit being provided with a first air intake for recycling air from the bottling room and a second air intake from outside the bottling room for bringing in fresh air, preferably from inside the second technical room.

11. The bottling plant according to claim 1, wherein the first technical room and the bottle forming unit are located in the freight container with at least one other unit of the bottling plant mounted between them, preferably the bottle forming unit being located in a corner of the bottling room which is opposite the part of the bottling room adjacent to the first technical room.

12. The bottling plant according to claim 1, wherein the freight container is a 20-foot freight container.

13. Method for producing bottles filled with drinkable water starting from a supply of preforms and caps and a supply of freshwater and using a transportable bottling plant according to claim 1.

14. Method of using a transportable bottling plant according to claim 1, wherein the bottling plant is used as a back-up plant for a permanent plant.

15. Method of using a transportable bottling plant according to claim 1, wherein the bottling plant is used as a temporary plant while a permanent plant is being set up.

* * * * *